(12) United States Patent
Okada et al.

(10) Patent No.: US 6,682,453 B1
(45) Date of Patent: Jan. 27, 2004

(54) HYDROSTATIC TRANSAXLE APPARATUS

(75) Inventors: Hideaki Okada, Amagasaki (JP); Masaru Iida, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 10/157,963

(22) Filed: May 31, 2002

(51) Int. Cl.[7] .......................... F16H 47/04; F16D 39/00
(52) U.S. Cl. ............................................. 475/83; 60/488
(58) Field of Search .......................... 60/488, 487, 486; 475/83

(56) References Cited

U.S. PATENT DOCUMENTS

| | | | | |
|---|---|---|---|---|
| 3,036,434 A | * | 5/1962 | Mark ........................ | 60/448 X |
| 4,856,368 A | * | 8/1989 | Fujisaki et al. ........... | 74/606 R |
| 4,979,583 A | | 12/1990 | Thoma et al. | |
| 5,951,425 A | * | 9/1999 | Iida et al. .................... | 475/83 |

FOREIGN PATENT DOCUMENTS

JP 2000213624 * 8/2000

* cited by examiner

*Primary Examiner*—Roger Pang
(74) *Attorney, Agent, or Firm*—Sterne, Kessler, Goldstein & Fox, P.L.L.C.

(57) ABSTRACT

A hydrostatic transaxle apparatus comprises a housing in which an HST, a pair of axles, a differential unit differentially connecting the axles to each other, and a horizontal counter shaft interposed between the HST and the differential unit. The HST comprises axial piston type hydraulic pump and motor mounted on vertically opposite surfaces of a center section, respectively, so as to be fluidly connected to each other so that pump and motor shafts are disposed vertically coaxially to each other. The center section is disposed adjacently to the differential unit and one of the axles. A cooling fan is fixed on the pump shaft projecting outward from the housing. When along the pump shaft, most of the housing except portions thereof for housing the respective axles is disposed within an area of rotary locus of the cooling fan.

25 Claims, 20 Drawing Sheets

HYDROSTATIC TRANSAXLE APPARATUS

BACKGROUND OF THE INVENTION

1. Field of the Invention

The present invention relates to a hydrostatic transaxle apparatus, especially, for a vehicle having a vertical crankshaft engine.

2. Background Art

A hydrostatic transaxle apparatus called an IHT comprises a hydrostatic transmission (hereinafter, referred to as an "HST"), an axle and a drive train interposed between the HST and the axle disposed together in a common housing. Some of various IHTs are used for a vehicle having a vertical crankshaft engine, wherein the rotary axis of the hydraulic pump of the HST must be disposed vertically, i.e., in perpendicular to the horizontal axle. If the rotary axis of the hydraulic motor of the HST is disposed horizontally, the drive train between the HST and the axle can be simplified. However, the configuration of a center section for fluidly connecting the hydraulic pump and motor to each other must be complicated. Further, output means such as a motor shaft of the hydraulic motor must be extended horizontally, thereby expanding the IHT in the horizontal direction.

In order to reduce the horizontal size of the IHT for a vertical crankshaft engine, and to simplify the center section of the HST, it is noticed that the rotary axis of the hydraulic motor may be disposed vertically. U.S. Pat. No. 4,979,583 discloses an IHT, wherein a hydraulic pump and a hydraulic motor are disposed vertically oppositely to each other so as to arrange both the rotary axes thereof vertically coaxially to each other.

The hydraulic pump and motor of U.S. Pat. No. '583 are of a radial piston type. That is, each of them comprises a rotor serving as a cylinder block, and pistons inserted in the rotor so as to reciprocate radially (horizontally). In the hydraulic pump, a cam ring (track ring) is provided around the rotor. The cam ring is equal to a movable swash plate of an axial piston type hydraulic pump. A track ring is also disposed around the rotor of the hydraulic motor, in place of a swash plate of an axial piston type hydraulic motor. Both the rotors are rotatably provided around a vertically axial common pintle. Oil passages are formed within the pintle so as to constitute a closed circuit between the hydraulic pump and motor. Also, a horizontally plain plate is disposed around the pintle so as to be sandwiched between the hydraulic pump and motor, thereby guiding the cam ring.

The disclosed HST is axially (vertically) short, however, still radially (horizontally) expanded because the track rings must be disposed concentrically with the respective rotors and the pistons must be allowed to reciprocate radially. This is an obstacle to minimization of the IHT in the radial direction of the HST. Further, for positioning the rotors and track rings, the plate to be sandwiched between the hydraulic pump and motor must be provided around the pintle, thereby increasing the number of parts and costs. If the HST was comprised of an axial piston type hydraulic pump and motor, a single member of the name of a center section could be used for fluidal connection of the hydraulic pump and motor and for positioning the hydraulic pump and motor.

BRIEF SUMMARY OF THE INVENTION

An object of the present invention is to provide a greatly minimized hydrostatic transaxle apparatus which may especially serve as an IHT for a vehicle having a vertical crankshaft engine, wherein a simple and economical configuration of an HST is secured. The hydrostatic transaxle apparatus comprises a housing filled therein with fluid so as to serve as a fluid sump, an axle disposed in the housing, a hydraulic pump disposed in the housing to be drivingly connected to a prime mover, a hydraulic motor disposed in the housing to be drivingly connected to the axle, and a center section disposed in the housing to fluidly connect the hydraulic pump and motor to each other.

To achieve the object, according to the present invention, the center section is disposed adjacently to the axle. The center section includes a pump mounting surface and a motor mounting surface in parallel to each other, onto which the hydraulic pump and the hydraulic motor are mounted respectively. A common axis penetrates the center section through both the pump mounting surface and the motor mounting surface so as to be disposed substantially perpendicularly to a longitudinal direction of the axle. Both rotary axes of the hydraulic pump and motor coincide with the common axis.

The axle is usually disposed horizontally. Thus, if the hydrostatic transaxle apparatus is adapted for a vehicle having a vertical crankshaft engine, the common axis and the rotary axes of the hydraulic pump and motor may preferably be vertical.

Accordingly, while the hydraulic pump and motor are disposed coaxially (preferably, vertically oppositely) to each other, the center section, which may be constituted by a single member, is used for fluidly connecting the hydraulic pump and motor, moreover for positioning the hydraulic pump and motor, thereby reducing the number of parts and costs.

The hydraulic pump and motor may be constituted by axial piston type hydraulic pump and motor, which are radially small. If the axle is disposed horizontally and the coaxial axes of the hydraulic pump and motor vertically, the hydrostatic transaxle apparatus can be horizontally minimized.

A pump shaft may serve as the rotary axis of the hydraulic pump, and the pump shaft may project outward from the housing so as to be fixedly provided thereon with a cooling fan. Preferably, most of the hydrostatic transaxle apparatus except the axle is disposed in an area of the rotary locus of the cooling fan when viewed along the pump shaft so as to minimize the size of the hydrostatic transaxle apparatus in the radial direction of the hydraulic pump and motor.

If the hydrostatic transaxle apparatus is comprised of a differential gear unit which differentially connects a pair of axles to each other, the center section adjacent to the axle may be also disposed adjacently to the differential unit. Correspondingly, the housing may comprise a pair of first portions for housing the respective axles, a second portion disposed between the first portions so as to house the differential unit, and a third portion interposed between one of the first portions and the second portion for housing the hydraulic pump and motor, wherein the center section is disposed substantially at the center of the third housing portion. In this case, the second and third portions of the housing are preferably disposed almost within the above-mentioned area of the rotary locus of the cooling fan.

While the pump shaft serves as the rotary axis of the hydraulic pump, a motor shaft may serve as the rotary axis of the hydraulic motor, and a common hole whose axis serves as the common axis may penetrate the center section through both the pump and motor mounting surfaces. In this case, the pump and motor shafts are inserted into the common hole. Assuming each of the pump and motor shafts has a first end surface and a second end surface, the first end surfaces are disposed in the common hole so as to face each other. The pump and motor shafts are extended oppositely to each other from the respective first end surfaces to the respective second end surfaces. If the pump and motor shafts are disposed vertically, the second end surfaces thereof define the top and bottom end surfaces of the HST.

In this arrangement, the axle may be disposed between a pair of parallel surfaces in which the second end surfaces of both the pump shaft and motor shaft are disposed respectively. Consequently, the axle and the HST are not offset from each other in the direction of the pump and motor shafts, thereby reducing the size of the hydrostatic transaxle apparatus in the same direction. If the pump and motor shafts are vertical, the vertical size of the hydrostatic transaxle apparatus can be reduced.

Furthermore, the axle may be disposed between a pair of parallel surfaces in which the first and second end surfaces of the motor shaft are disposed respectively. Thus, the axle can approach the motor shaft so as to secure a nice power transmission efficiency and a compact drive train therebetween. Further, if the motor shaft is disposed vertically and under the pump shaft, the height of the axle can be desirably lowered.

To prevent the pump and motor shafts from impeding each other in rotation, the common hole of the center section is shaped so as to separate the first end surfaces of the pump and motor shafts therein from each other.

The center section may be formed with a charge suction port for supplying fluid from the housing into the fluid circuit within the center section, and a partition wall may be provided to separate the charge suction port from the hydraulic pump and motor mounted on the center section. Therefore, impurities caused by operation of the HST can be prevented from being absorbed into the charge suction port.

The center section may be separably secured in the housing, thereby facilitating maintenance of the HST.

The housing may be constituted by a pair of first and second housing members joined to each other through a joint surface along a longitudinal direction of the axle, wherein the hydraulic pump may be disposed in the first housing member, and the hydraulic motor may be disposed in the second housing member, thereby facilitating maintenance of the interior parts of the hydrostatic transaxle apparatus. In this configuration, the center section may be separably secured with the first housing member so as to be laid between the hydraulic pump and the hydraulic motor in the housing along the joint surface.

A counter shaft may be provided for transmitting output force of the hydraulic motor to the axle. The counter shaft may be interposed between the motor shaft and the differential unit.

As an aspect for rotatably supporting the counter shaft, a support member which is separate from the housing may be fixed in the housing, thereby simplifying the housing out of consideration of journalling the counter shaft.

One side surface of the support member may be used for controlling a brake for braking the counter shaft, thereby reducing the number of parts for the brake. As one aspect thereof, a brake rotor is fixed on the counter shaft so as to be pressed against the one side surface of the support member.

A plurality of the support members may serve as the support member. One of the support members may be formed so as to retain a motor swash plate of the axial piston type hydraulic motor on an input side of the counter shaft, thereby reducing the number of parts.

Alternatively, a retainer for retaining the motor swash plate may be provided separately from the housing or the support member. The retainer may be separably secured with the housing, or with either the first or second housing member. Alternatively, the retainer may be fixed to the center section. Regardless, the housing, or one of the first and second housing members can be simplified in comparison with that and is formed so as to retain the motor swash plate.

For transmitting power from the motor shaft to the axle, a bevel gear or a face gear may be used.

Further, a control shaft rotatably supported by the housing for controlling the capacity and oil discharging direction of the hydraulic pump may be disposed in parallel to the counter shaft so that the control shaft and the counter shaft may be juxtaposed on a surface along the common axis penetrating the center section. This further reduces the size of the hydrostatic transaxle apparatus in the radial direction of the HST.

In order to reduce the size and costs of a hydrostatic transaxle apparatus, a second object of the present invention is to provide a compact and economic HST comprising hydraulic pump and motor. A center section incorporates a pair of oil passages for fluidly connecting the hydraulic pump and motor to each other, a simplified oil-charge valve structure for supplying the pair of oil passages with hydraulic oil, and a simplified oil-draining structure for draining oil from the pair of oil passages while a vehicle having the hydrostatic transaxle apparatus being drafted.

To achieve the object, a check valve for supplying the pair of oil passages in the center section with hydraulic oil is also used as a member for draining oil from the oil passages. Therefore, the number of components for constituting a valve for draining oil from the oil passages, which is separate from the check valve for oil-supply, are canceled so as to contribute for reducing the size and costs of the center section. Moreover, it resolves the dimensional dispersion of the components of the separate oil-draining valve causing the wrong performance of oil draining.

For constituting this valve, a pair of valve casings, each of which incorporates a valve member such as a ball or the like, are inserted into the center section so as to be rotatable around substantially horizontal axes thereof. The valve casings are turned over simultaneously, thereby being selectively put into either a charge (oil supply) mode or a drain mode. In the charge mode, a valve seat in each valve casing is arranged under the valve member so that the valve member in the higher-pressured oil passage is put on the valve seat and the other valve member in the lower-pressured oil passage is separated from the valve seat by the pressure of oil flowing into the center section from the oil sump in a housing incorporating the center section. In the drain mode, the valve seat in each valve casing is set above the valve member so that the valve member is constantly separated from the valve seat, thereby enabling the pressured oil in the center section to flow out into the oil sump in the housing.

An outer end portion of the valve casing, which projects outward from the housing, is formed with a fitting portion fitting a tool for rotating the valve casing, e.g., a slot into which a tip of a screwdriver is inserted. Accordingly, the rotation of the valve casing for switching its mode can be easily operated from the outside of the housing.

The outer end portion of the valve casing is partly cut away so as to set the valve casing into a position corresponding to one of the two modes. A spring member is pressured against the outer end portion of the valve casing. When setting one mode, the spring member is pressured against the cut-away surface so as to locate the valve casing. When setting the other mode, the spring member is pushed and raised by a side of the valve casing opposite to the cut-away surface.

These, other and further objects, features and advantages of the present invention will appear more fully from the following description.

BRIEF DESCRIPTION OF DRAWINGS/ FIGURES

DETAILED DESCRIPTION OF THE INVENTION

Figure 1:
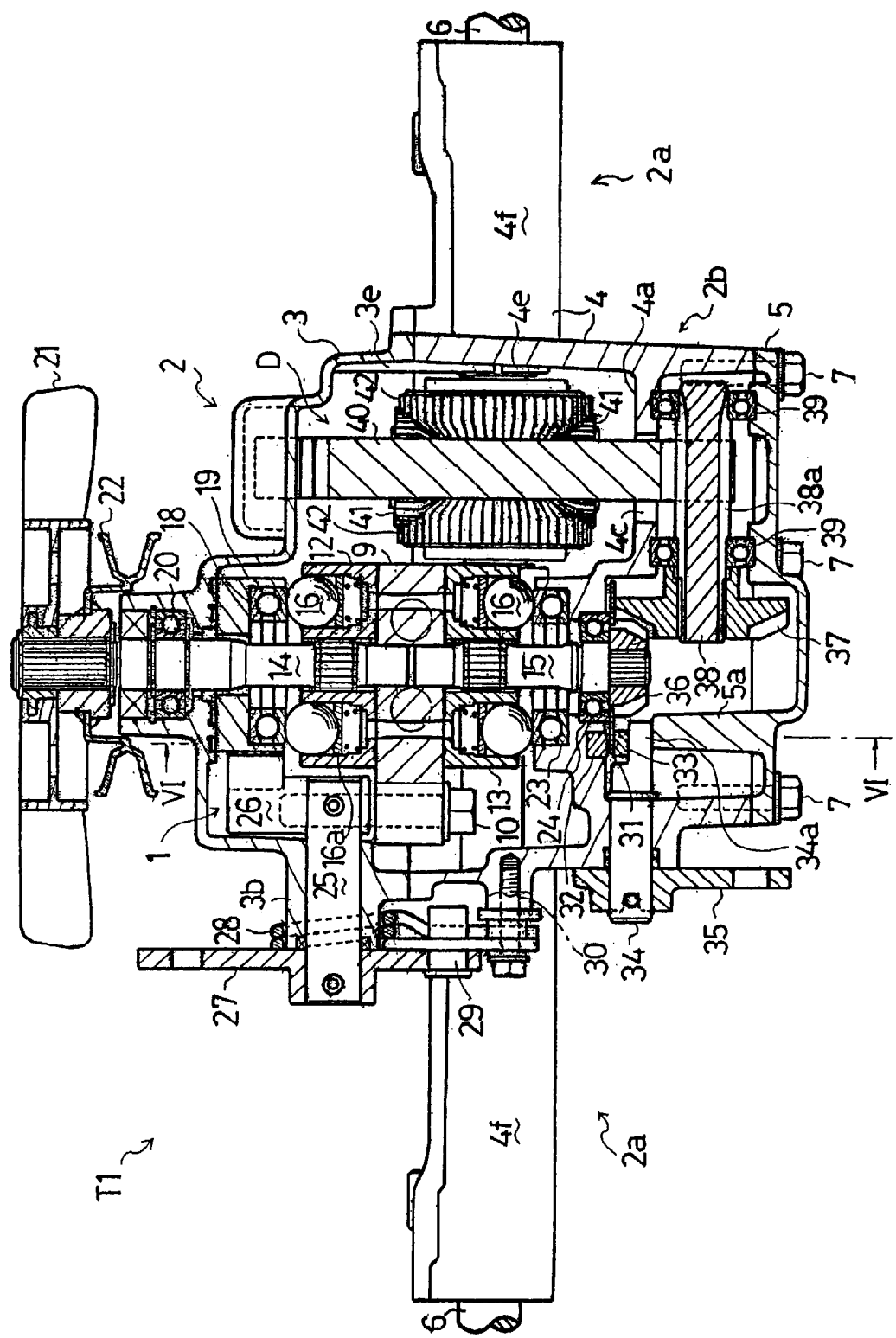
FIG. 1 is a sectional front view of a hydrostatic transaxle apparatus T1 according to a first embodiment of the present invention.
Figure 2:
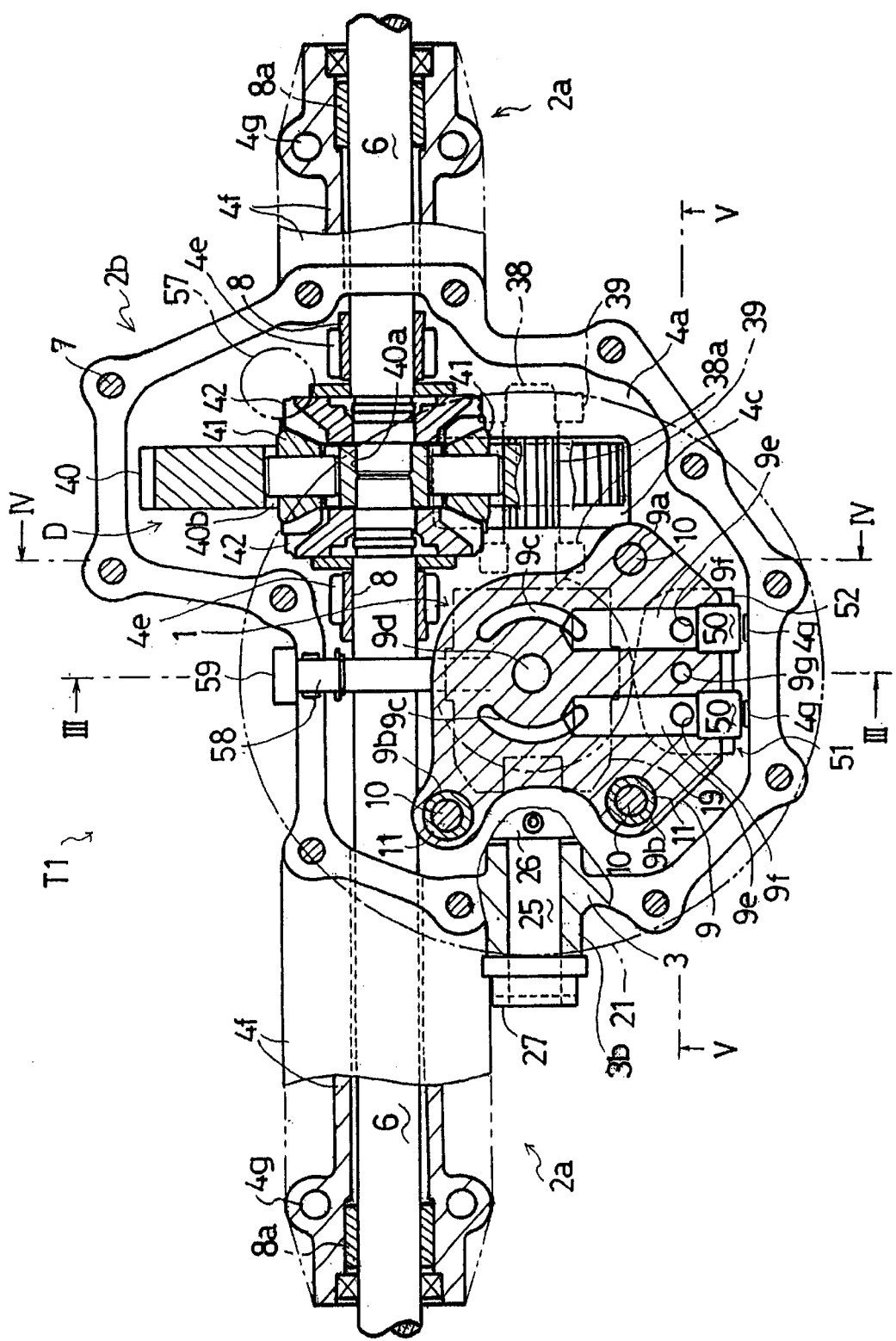
FIG. 2 is a plan view partly in section of the same from which a top housing member 3 is removed.

A hydrostatic transaxle apparatus of the present invention is essentially constituted by a transaxle housing 2 containing an HST 1, a differential gear unit D and a pair of coaxial axles 6, together. As shown in FIGS. 1 and 2, transaxle housing 2 consists of a central main part 2b and a pair of axle housing parts 2a extended laterally outward from main part 2b oppositely to each other. In main part 2b are disposed HST 1, differential gear unit D and proximal portions of axles 6. Axle housing parts 2a contains and journals distal portions of respective axles 6.

Description will be given of a hydrostatic transaxle apparatus T1 serving as a first embodiment of the present invention in accordance with FIGS. 1 to 7. A transaxle housing 2 of hydrostatic transaxle apparatus T1 consists of top, middle and bottom housing members 3, 4 and 5 joined to one another. A pair of left and right axles 6 are coaxially disposed horizontally and journalled by middle housing member 4. Above axles 6, top and middle housing members 3 and 4 are jointed to each other through a substantially horizontal surface J along axes of axles 6 by bolts 7 (See e.g. FIG. 5). Below axles 6, middle and bottom housing members 4 and 5 are jointed to each other through a substantially horizontal surface along the axes of axles 6 by bolts 7. (See e.g. FIG. 6)

Figure 4:
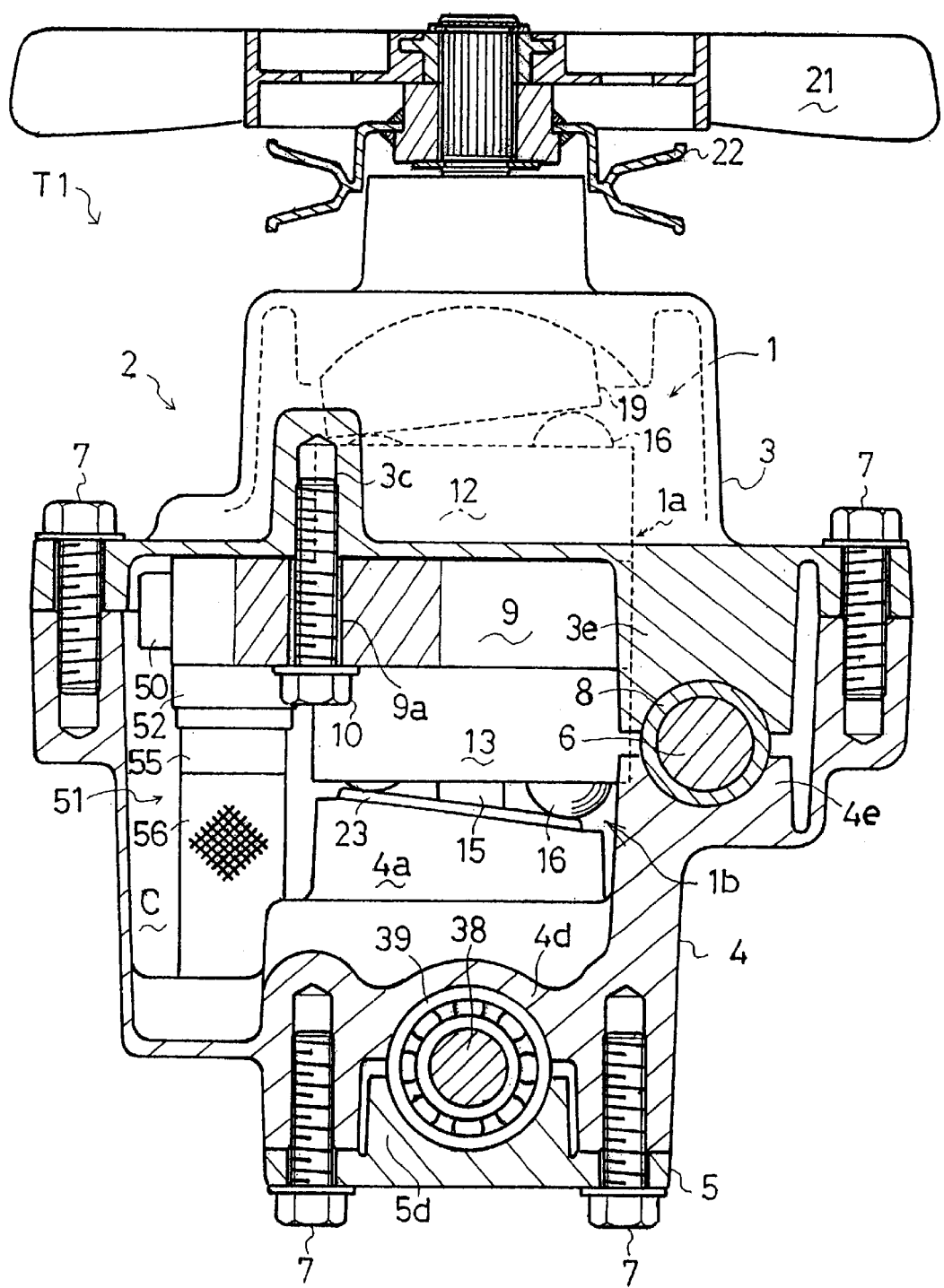
FIG. 4 is a cross sectional view taken on line IV—IV of FIG. 2.

As shown in FIG. 4, for journalling each axle 6 disposed below joint surface J, bearings 8 and 8a are provided on axle 6. Bearing 8 is disposed adjacently to each of later-discussed differential bevel side gears 42 of a differential gear unit D. Retaining portions 3e are extended downward from the ceiling surface of top housing member 3 so as to hold upper halves of respective bearings 8. On the other hand, retaining portions 4e are extended upward from the bottom surface of middle housing member 4 toward respective retaining portions 3e so as to hold lower halves of respective bearings 8. Further, for housing distal portions of respective axles 6 (between bearings 8 and 8a), middle housing member 4 is integrally formed with left and right axle housing portions 4f serving as axle housing parts 2a of transaxle housing 2, which are extended oppositely left and right from a central middle chamber of middle housing member 4 incorporating HST 1 and differential gear unit D. Each bearing 8a is disposed in a tip portion of each axle housing portion 2a (which is axle housing portions 4f of middle housing member 4 in the case of transaxle apparatus T1). Incidentally, each of axle housing portion 4f is formed with bolt holes 4g for fixture to a vehicle frame.

For constituting an HST 1, a center section 9 is separably secured with top housing member 3 through three bolts 10.

Figure 5:
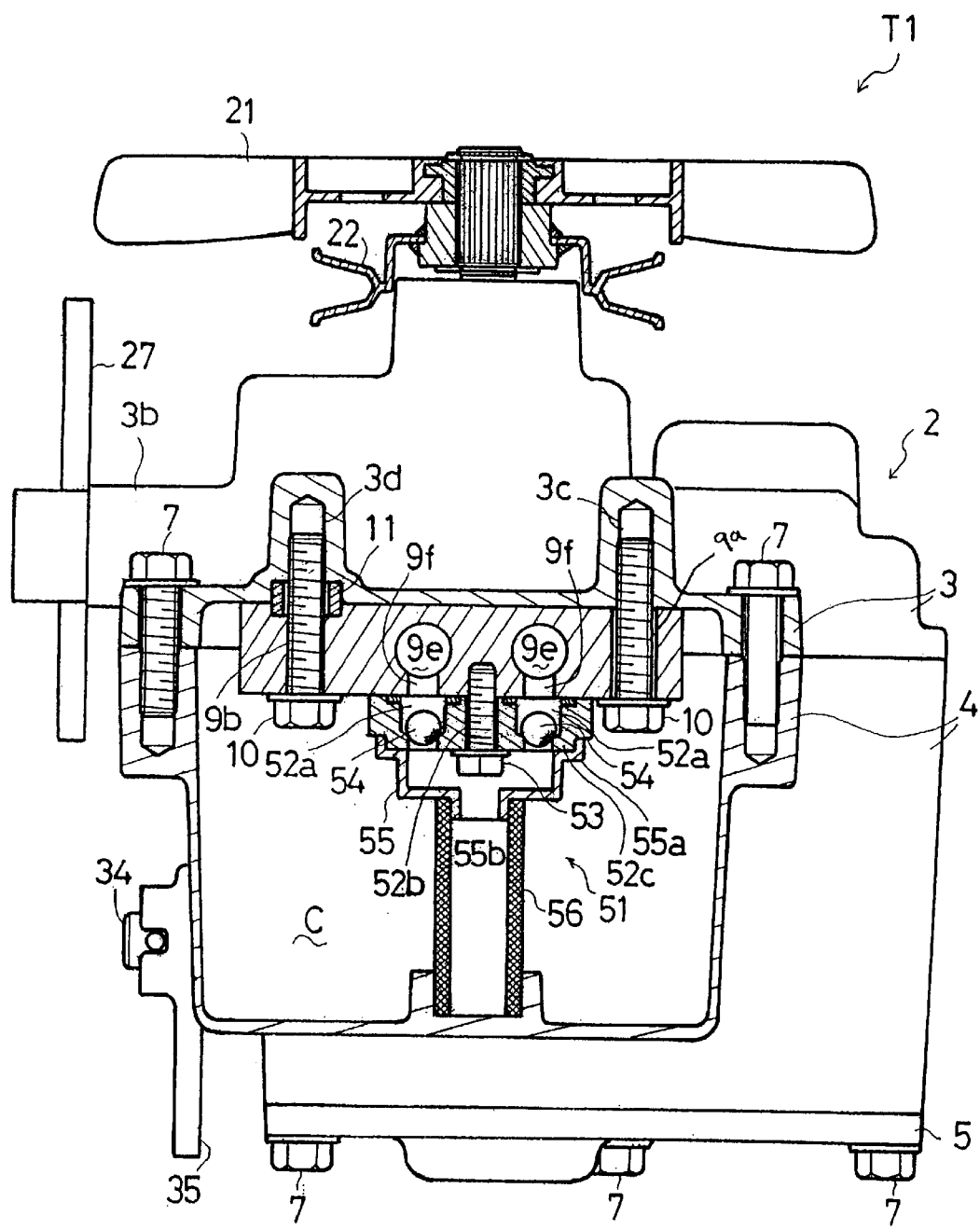
FIG. 5 is a cross sectional view taken on line V—V of FIG. 2.
Figure 7:
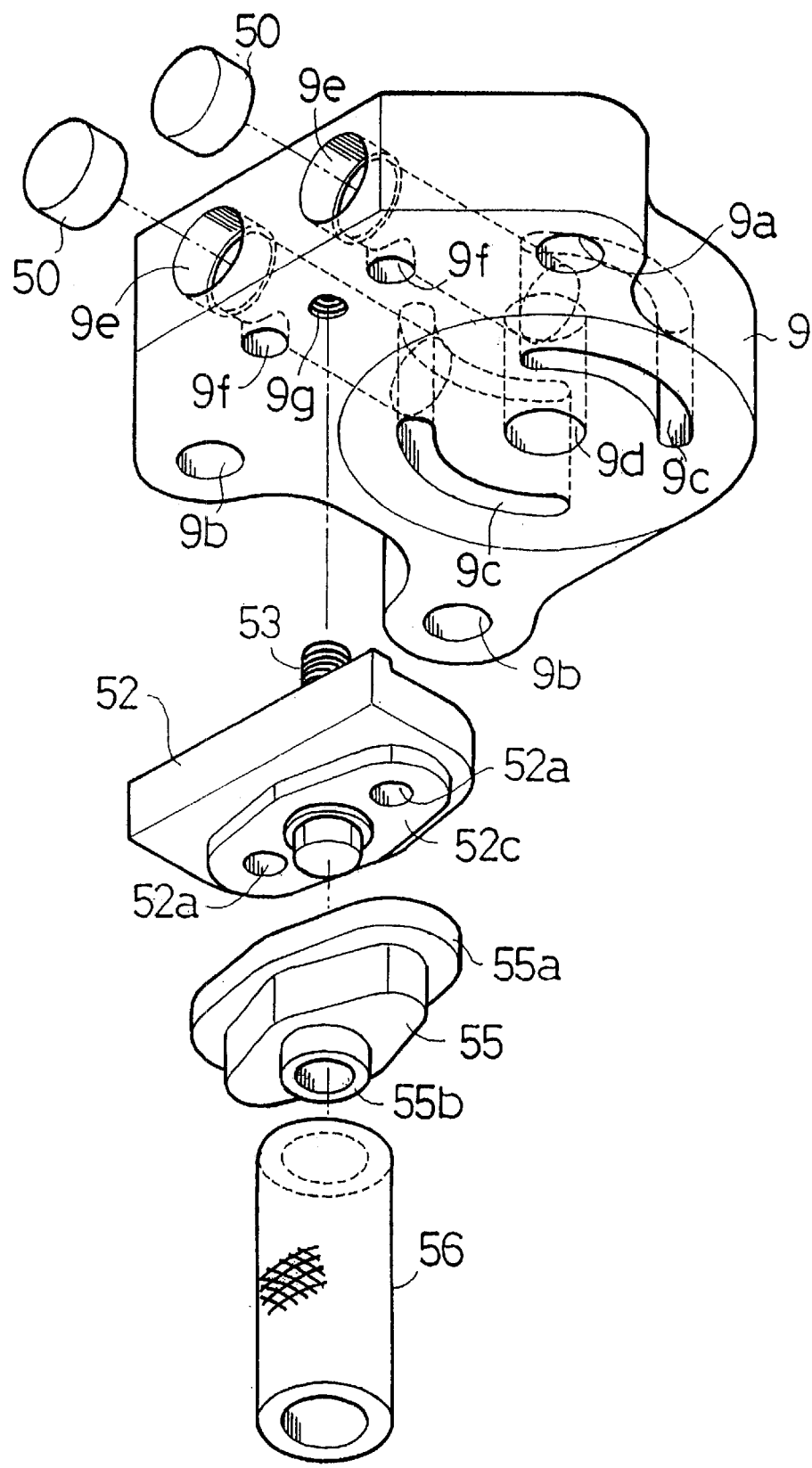
FIG. 7 is an exploded perspective bottom view of an oil charge assembly 50 attached to a center section 9 of an HST 1.

As shown in FIGS. 2 and 7, in correspondence to bolts 10, center section 9 is vertically pierced by a bolt hole 9a and two bolt holes 9b. As shown in FIG. 5, bolt hole 9a is slightly diametrically larger than bolt 10 so as to allow bolt 10 to pass therethrough freely. Top housing member 3 is formed with a female screw 3c, into which bolt 10 passed through bolt hole 9a is upwardly screwed. Each of bolt holes 9b is formed as a female screw so as to engage with bolt 10. However, the top opening of bolt hole 9b is diametrically expanded so as to allow a collar 11 to be inserted therein. For engaging with bolts 10 through bolt hole 9b, top housing member 3 is further formed with female screws 3d, whose bottom openings are diametrically expanded correspondingly to collars 11.

For properly positioning center section 9 before screwing bolts 10, collar 11 is disposed in the expanded top opening of each of bolt holes 9b. The top surface of center section 9 is fit to the ceiling bottom surface of top housing member 3 so as to insert collars 11 into the respective expanded bottom opening of female screws 3d. Then, two bolts 10 are upwardly screwed through bolt holes 9b, passed through collars 11, and screwed into female screws 3d, respectively. Finally, bolt 10 is passed through bolt hole 9a and screwed into female screw 3c. Even if center section 9 slightly deviates, bolt hole 9a absorbs the deviation. It is understood that the number of bolts 10 and corresponding portions and members can be changed.

Center section 9 is a rather thin plate-like block having a pair of parallel plain top and bottom surfaces. Center section 9, as a result of the above-mentioned fastening thereof to top housing member 3, is disposed at the substantially vertically middle in transaxle housing 2. More specifically, the top and bottom surfaces of center section 9 are disposed horizontally so that the horizontal joint surface between top and middle housing members 3 and 4 (except their portions for journalling axles 6) comes to be disposed between the top and bottom surfaces of center section 9.

As shown in FIG. 2, a part of the periphery of center section 9 is disposed extremely adjacent to axle 6. Thus, hydrostatic transaxle apparatus 1 can be shortened in the fro-and-rear direction thereof.

For constituting a hydraulic pump 1a, the top surface of center section 9 serves as a pump mounting surface, onto which a pump cylinder block 12 is slidably rotatably fitted. For constituting a hydraulic motor 1b, the bottom surface of center section 9 serves as a motor mounting surface, onto which a motor cylinder block 13 is slidably rotatably fitted. Consequently, pump and motor cylinder blocks 12 and 13 are vertically oppositely disposed through center section 9. More specifically, pump cylinder block 12 is disposed in top housing member 3, and motor cylinder block 13 in middle housing member 4.

Center section 9 is vertically pierced through the pump and motor mounting surfaces by a pair of kidney ports 9c so as to fluidly connect pump and motor cylinder blocks 12 and 13 to each other. That is, only the pair of kidney ports 9c formed in center section 9 serve as the closed hydraulic oil circuit between hydraulic pump 1a and hydraulic motor 1b.

Figure 3:
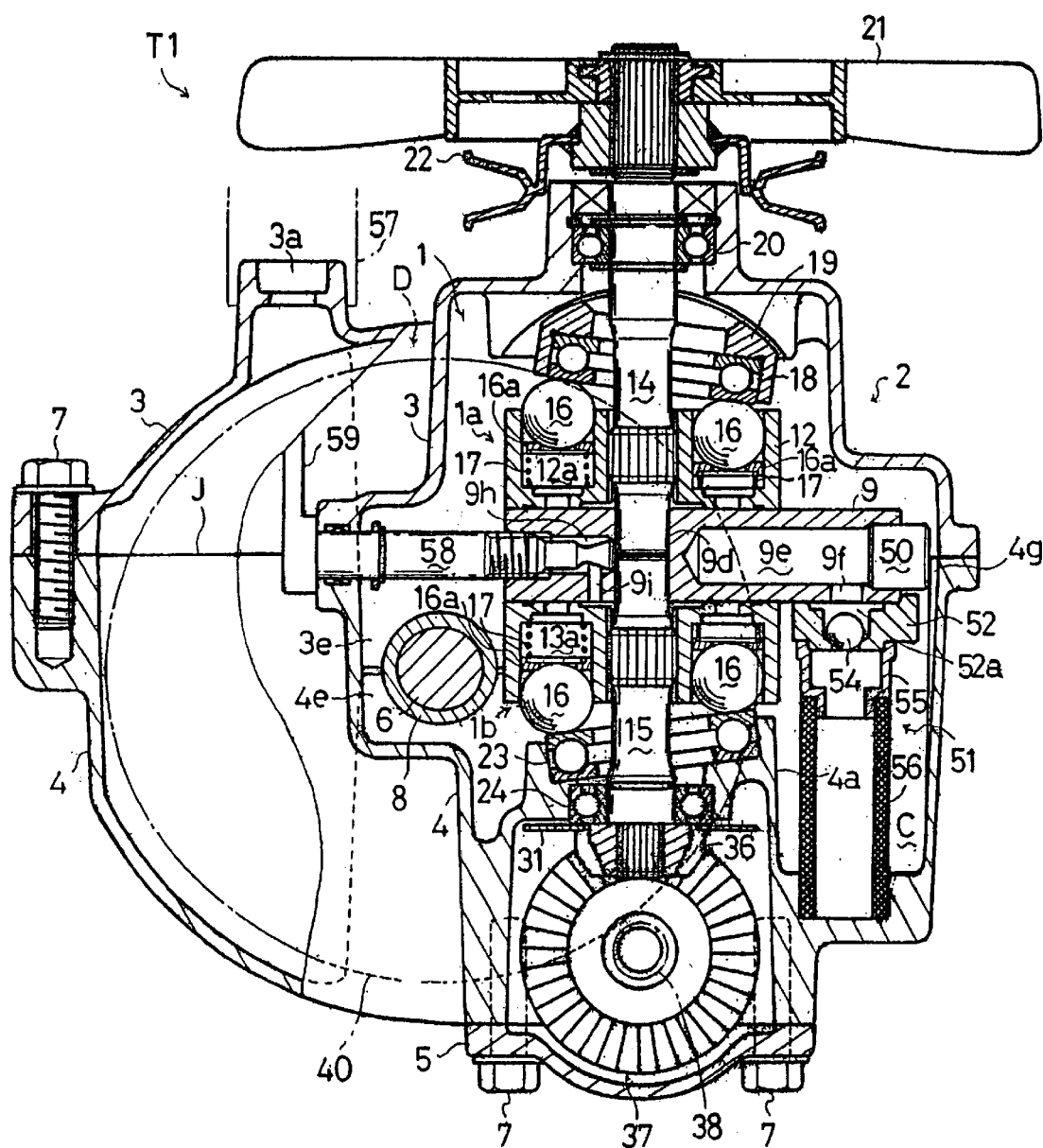
FIG. 3 is a cross sectional view taken on line III—III of FIG. 2.

For filling the closed hydraulic oil circuit in center section 9 with oil, center section 9 is bored by a pair of horizontal oil passages 9e. The inward ends of oil passages 9e are joined to respective kidney ports 9b. Oil passages 9e are outwardly open at the front end surface of center section 9, and plugged by respective plugs 50. In center section 9, a pair of vertical suction ports 9f branch downward from respective oil passages 9e just behind plugs 50. Incidentally, while, as shown in FIG. 3, plugs 50 are arranged so as to be intersected by horizontal joint surface J between housing members 3 and 4, the lower half outer end surfaces of plugs 50 abut against respective inward projections 4g formed on the inside surface of middle housing member 4, as shown in FIG. 2, thereby being located horizontally. Suction ports 9f are open downward at the bottom surface of center section 9. As shown in FIG. 7, center section 9 is bored by a female screw 9g between charge suction ports 9f in parallel.

As shown in FIGS. 3 and 5, an oil charge assembly 51 is configured downward from the front portion of center section 9 to the front bottom surface of middle housing member 4. FIG. 7 illustrates exploded oil charge assembly 50 during assembly. The configuration thereof will be described.

A charge valve casing 52 vertically pierced by a pair of parallel charge ports 52a is fitted onto the front bottom surface of center section 9 so as to bring charge valve ports 52a into communication with respective charge suction ports 9f in center section 9. The front end of charge valve casing 52 is upwardly angled so as to fit the front surface of center section 9. Further, a vertical female screw 52b is formed through charge valve casing 52 between charge valve ports 52a. A bolt 53 is upwardly screwed through female screw 52b into female screw 9g, thereby fixing charge valve casing 52 to center section 9.

As shown in FIG. 5, a ball 54 is disposed in each charge port 52a so as to serve as a check valve. The bottom opening of each charge port 52a is narrowed so as to serve as a seat for ball 54. Therefore, the check valve allows only the upward oil flow into center section 9.

As shown in FIGS. 3, 5 and 7, a cylindrical oil filter 56 is vertically hung from the bottom of charge valve casing 52 through a joint member 55. In this regard, charge valve casing 52 is formed at the bottom thereof with a convex surface 52c, which is engaged into a flange 55a formed on the top end of joint member 55. Thus, joint member 55 is fitted onto the bottom of charge valve casing 52 so as to enclose the bottom openings of both charge valve ports 52a and the head of bolt 53. A cylindrical bottom end 55b of joint member 55 is inserted into the top end of oil filter 56. The bottom end of oil filter 56 is fitted into a recess formed in the front bottom portion of middle housing member 4 so that oil filter 56 is disposed in front of hydraulic motor 1b. Accordingly, oil filled in transaxle housing 2 can be supplied into kidney ports 9c within center section 9 through oil filter 56 and the check valves within check valve casing 51.

Incidentally, as shown in FIG. 3, top housing member 3 partly projects upward so as to serve as an oil port 3a, which is connected to an external oil reservoir 57 so as to fill oil in transaxle housing 2 regularly.

Center section 9 is pierced through both the top and bottom surfaces thereof, i.e., the pump and motor mounting surfaces by a vertically axial hole 9d which are surrounded by the pair of kidney ports 9c. A pump shaft 14 vertically penetrates pump cylinder block 12 so as to be axially slidably but not-relatively rotatably fit to pump cylinder block 12 through splines. Also, a motor shaft 15 vertically penetrates motor cylinder block 13 so as to be axially slidably but not-relatively rotatably fit to motor cylinder block 13 through splines. A bottom portion of pump shaft 14 and a top portion of motor shaft 15 are slidably rotatably inserted together into axial hole 9d so that the horizontal bottom end surface of pump shaft 14 and the horizontal top end surface of motor shaft 15 face each other in axial hole 9d.

Pump cylinder block 12 is bored with a plurality cylinder holes 12a surrounding pump shaft 14, and motor cylinder block 13 with a plurality cylinder holes 13a surrounding motor shaft 15. A ball type piston 16 and a spring 17 for outwardly biasing piston 16 are inserted into each of cylinder holes 12a and 13a. Thus, axial piston type hydraulic pump 1a and hydraulic motor 1b are constituted.

Additionally, in order to increase the volumetric efficiency of HST 1, an annular seat 16a may be interposed between each piston 16 and each spring 17. The inner periphery of seat 16a is shaped so as to fit piston 16 and the outer periphery of seat 16a fits the inner peripheral surface of each of cylinder holes 12a and 13a, thereby sealing hydraulic oil in each of cylinder holes 12a and 13a.

In center section 9, a horizontal drain hole 9h is extended backward from the vertical intermediate portion of axial hole 9d through a portion of center section 9 between kidney ports 9c, and open outward at the rear end of center section 9. Axes of drain hole 9h and oil passages 9e are disposed substantially at the same level on the horizontal joint surface between middle and bottom housing members 4 and 5. Adjacently to axial hole 9d, a drain port 9i branches from drain hole 9h so as to be open downward at the bottom surface, i.e., the motor mounting surface of center section 9.

An outward half area of drain hole 9h is formed into a female screw. A rod 58, whose intermediate portion is threaded, is screwed forward into drain hole 9h. In the inward half area of drain hole 9h, an inward portion of rod 58 is narrowed and formed like a spool. An outer end of rod 58 is rotatably supported between middle and bottom housing members 4 and 5. Outside transaxle housing 2, a drain lever 59 is fixed onto the outer end of rod 58.

By rotating drain lever 59, rod 58 is moved horizontally either inward or outward in drain hole 9h. Usually, rod 58 is fixed so as to set the inner spool-like end thereof extremely close to axial hole 9d. In this state, rod 58 securely separates drain port 9i from the oil sump in transaxle housing 2 outside of center section 9 so as to establish the closed hydraulic oil circuit between pump and motor cylinder blocks 12 and 13 through kidney ports 9c in center section 9.

If a vehicle, e.g., a tractor, equipped with hydrostatic transaxle apparatus 1 is going to be pulled while being neutral in its power transmission, motor shaft 15 interlocking with axles 6 must be allowed to rotate freely from the hydraulic oil pressure in HST 1. Otherwise, axles 6 connected to drive wheels of the vehicle would be heavy to be rotated, and further, the rotation of axles 6 and motor shaft 15 would be oppositely transmitted to pump shaft 14 through HST 1, further to an engine of the vehicle, thereby damaging HST 1 and the engine.

Thus, for letting motor shaft 15 free from the hydraulic pressure in HST 1, drain lever 59 is rotated so as to move rod 58 outward (backward) so that the inner spool-like end of rod 58 is moved away from axial hole 9d to set behind drain port 9i. Therefore, the pressured oil in drain hole 9h flows out from drain port 9i and pushes motor cylinder block 13 apart from center section 9 so that the hydraulic oil in kidney ports 9c can be also drained to the oil sump in transaxle housing 2 so as to reduce the hydraulic pressure in the hydraulic circuit of HST 1, thereby releasing motor shaft 15 from the hydraulic oil pressure.

A thrust bearing serving as a movable pump swash plate 18 is disposed above pump cylinder block 12 so as to abut against pistons 16 in pump cylinder block 12. A retainer 19, which can be tilted while fitting an inner ceiling surface of top housing member 3, holds pump swash plate 18.

Pump shaft 14 is extended vertically upward, freely rotatably passed through pump swash plate 18 and retainer 19, journalled by top housing member 3 through a bearing 20, and projects upwardly outward from top housing member 3. A cooling fan 21 and an input pulley 22 are fixed onto the upward projecting top portion of pump shaft 14.

On the other hand, a thrust bearing serving as a fixed motor swash plate 23 is disposed below motor cylinder block 13 so as to abut against pistons 16 in motor cylinder block 13. Middle housing member 4 is integrally formed with a partition wall 4a so as to separate the inner space of middle housing member 4 into upper and lower spaces. Partition wall 4a is partly formed so as to retain motor swash plate 23 so that motor swash plate 23 cannot be tilted in partition wall 4a.

Motor shaft 15 is extended vertically downward in the upper space of middle housing member 4, freely rotatably passed through motor swash plate 23, journalled by partition wall 4a through a bearing 24, and projects downward into the lower space of middle housing member 4. In the lower space of middle housing member 4, a bevel-like motor output gear 36 is fixed onto the bottom end portion of motor shaft 15.

As shown in FIG. 4, the front end of partition wall 4a is extended vertically downward to the front bottom surface of middle housing member 4. The vertical front end of partition wall 4a is spread in parallel to axles 6 between oil filter 56 and hydraulic motor 1b. Further, for setting motor swash plate 23 upwardly forward slantwise at a fixed tilt angle, the front end of partition wall 4a in front of motor swash plate 23 arises higher than the rear end thereof behind motor swash plate 23, so that the gap between the front end of partition wall 4a and the front end of motor cylinder block 13 is extremely reduced. Thus, a front chamber C is formed of middle housing member 4, in which oil charge assembly 51 is enclosed so as to prevent oil filter 56 from absorbing impurities generated by operation of HST 1 and meshing of gears among motor shaft 15, a counter shaft 38, a differential gear unit D and axles 6.

In this way, axial piston type hydraulic pump 1a and motor 1b are disposed vertically oppositely and coaxially to each other, thereby constituting a greatly horizontally minimized HST. Therefore, with respect to axle housing parts 2a and main part 2b of transaxle housing 2, when viewed in plan, i.e., when viewed along pump and motor shafts 14 and 15, most of main part 2b including entire HST 1 and the major region of differential gear unit D is located within the area of the rotary locus of cooling fan 21 while only axle housing parts 2a and the minor region of differential gear unit D are out of the area, as shown in FIG. 2. The same is true in not only transaxle apparatus T1 but also transaxle apparatuses T2, T3, T4 and T5 as the second to fifth embodiments of the present invention.

The upper space in middle housing member 4 communicates with the interior space of top housing member 3 so as to constitute a chamber in which HST 1 comprising hydraulic pump 1a and motor 1b is disposed.

For controlling the tilt angle of pump swash plate 18, a speed control shaft 25 is disposed horizontally in parallel to axles 8, and rotatably supported by a boss portion 3b formed of top housing member 3. In transaxle housing 2, an arm 26 is fixed onto an inner end portion of speed control shaft 25 and engages with retainer 19. An intermediate portion of a speed control lever 27 is fixed onto an outer end portion of speed control shaft 25 outside transaxle housing 2. Speed control lever 27 is operatively connected at an upper end thereof to a manual speed control operation device such as a lever or a pedal provided on a vehicle.

A coiled and twisted spring 28 is wound around boss portion 3b so as to bias speed control lever 27 toward the neutral position. A retaining pin 29 is disposed horizontally in parallel to speed control shaft 25 and fixed onto a lower end of speed control lever 27. Below retaining pin 29, an eccentric bolt 30 is disposed horizontally in parallel to retaining pin 29 and screwed into a side wall of middle housing member 4. Two end portions of spring 28 are extended downward so as to sandwich retaining pin 29 and eccentric bolt 30 and press them toward each other. Therefore, speed control lever 27, when being loosened, is held at its neutral position. The neutral position of speed control lever 27 can be adjusted by rotating eccentric bolt 30.

When the speed control operation device on the vehicle is manipulated, speed control lever 27 is rotated together with speed control shaft 25 against the biasing force of spring 28 so as to tilt retainer 19 together with pump swash plate 18. According to the tilt angle and direction of pump swash plate 18, the capacity and oil-discharging direction of hydraulic pump 1a varies, thereby rotating hydraulic motor 1b at various speeds in one selective direction of two opposite directions.

Beneath partition wall 4a, a horizontal ring-like brake rotor 31 is vertically slidably provided around motor output gear 36 along the bottom surface of partition wall 4a so as to be rotatable integrally with motor output gear 36.

Figure 6:
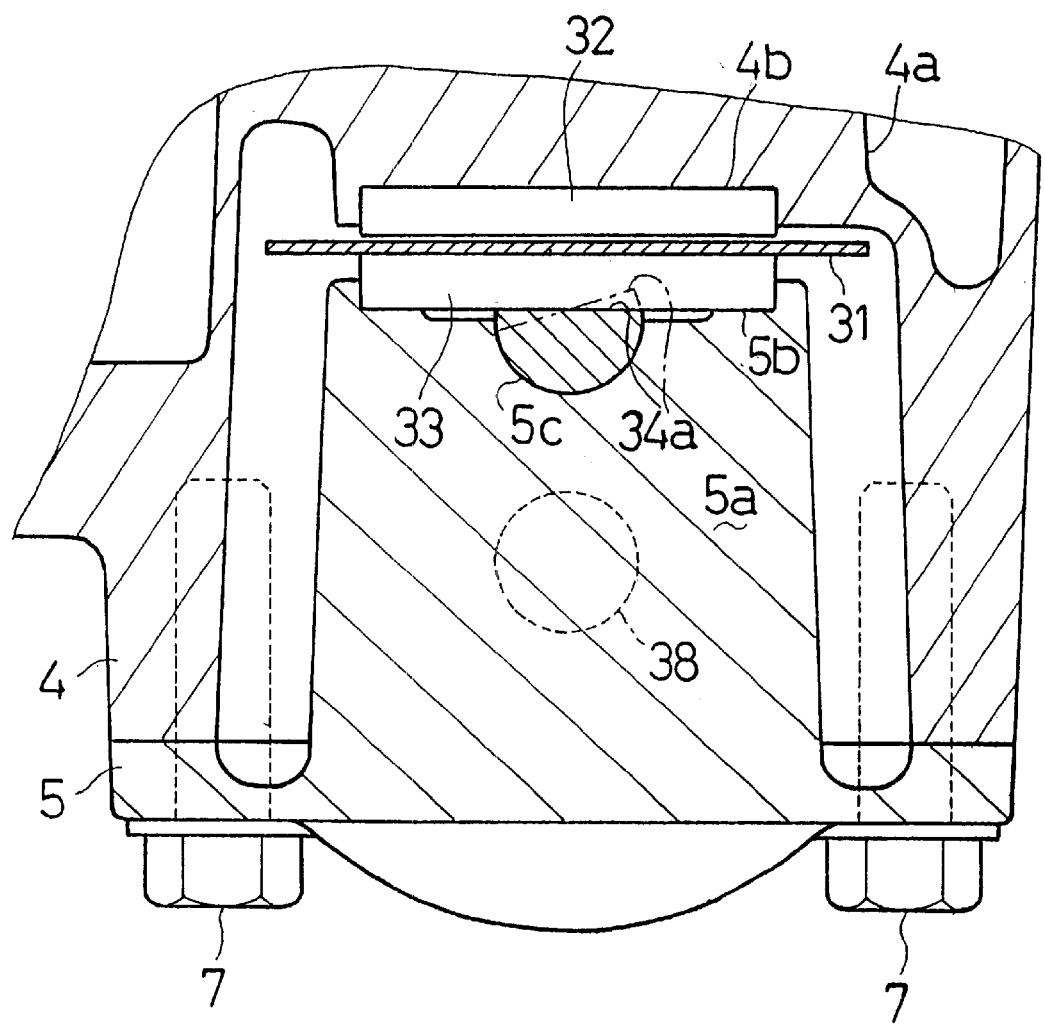
FIG. 6 is a fragmentary view taken on line VI—VI of FIG. 1.

As shown in FIGS. 1 and 6, partition wall 4a is upwardly recessed at the bottom thereof so as to form an upper recess 4b, into which an upper friction pad 32 is engaged. On the other hand, an upright plate-like retaining portion 5a is formed of bottom housing member 5, and retaining portion 5a is downwardly recessed at the top thereof so as to form a lower recess 5b, into which a lower friction pad 33 is engaged. Consequently, upper and lower friction pads 32 and 33 are disposed vertically symmetrically to each other through brake rotor 31.

A brake control shaft 34 is horizontally disposed and rotatably supported by a side wall of middle housing member 4. On the same side with speed control lever 27, a brake lever 35 is fixed onto an outer end of brake control shaft 34. A manual brake operation device such as a lever or a pedal provided on a vehicle is operatively connected to an utmost end of brake lever 35.

A periphery of the inner end portion of brake control shaft 34 is approximately half cut away. The cut flat surface of brake control shaft 34 serves as a cam surface 34a. Retaining portion 5a is further recessed downward at the substantially longitudinally middle position of lower recess 5b so as to form a semicircular recess 5c. When brake lever 35 is disposed at its brake-release position, as illustrated in a sold line in FIG. 6, the sectionally semicircular proximal portion of brake control shaft 34 is slidably rotatably inserted in semicircular recess 5c. In this situation, cam surface 34a is horizontally disposed at the top thereof.

When the brake operation device on the vehicle is operated for braking so as to rotate brake lever 35 together with brake control shaft 34, cam surface 34a is vertically inclined, as illustrated in a phantom line in FIG. 6. Therefore, one side edge of cam surface 34a upwardly presses brake rotor 31 through friction pads 32 and 33 so as to brake motor shaft 15 together with brake rotor 31, thereby braking axles 6.

For transmitting the torque of motor shaft 15 to axles 6, a counter shaft 38 is disposed horizontally in parallel to axles 6 and supported rotatably through left and right bearings 39 between partition wall 4a and the bottom surface of bottom housing member 5. A bevel-like counter input gear 37 is fixed onto an input side end of counter shaft 38 so as to engage with motor output gear 36.

As shown in FIG. 4, each bearing 39 is retained between an upper bearing-retaining portion 4d formed of middle housing member 4 and a lower bearing-retaining portion 5d formed of bottom housing member 5. Upper and lower bearing-retaining portions 4d and 5d are vertically extended toward each other at the intermediate area of middle and bottom housing members 4 and 5 in the fro-and-rear direction thereof. Each upper bearing-retaining portion 4d is semicircularly cut away for fitting the upper half of each bearing 39, and each lower bearing-retaining portion 5d is similar to fit the lower half of each bearing 39. Therefore, bearings 39 are fixedly sandwiched between upper and lower bearing-retaining portions 4d and 5d, respectively. Further, the falling portion of partition wall 4a above counter shaft 38 is arcuately expanded upward so as to secure the space for arranging bearings 39 therebeneath.

The portion of partition wall 4a above bevel gears 36 and 37 is disposed high enough to secure a sufficiently large diameter of counter input gear 37 for providing an adequate speed reduction ratio between gears 36 and 37, while the remaining portion of partition wall 4a above counter shaft 38 falls a degree so as to minimize bearings 39. Further, as shown in FIG. 3, the bottom surface of bottom housing member 5 is arcuately expanded downward so as to enclose counter input gear 37.

As shown in FIG. 6, when viewed in the lateral direction of hydrostatic transaxle apparatus T1, i.e., along axles 6, brake control shaft 34 and counter shaft 38 are juxtaposed in parallel to each other on a common vertical line. In other words, axes of both shafts 34 and 38 are disposed on a common vertical surface in parallel to axles 6. The vertical common axis of pump and motor shafts 14 and 15 is substantially disposed on this common vertical surface. Therefore, transaxle housing 2, particularly, housing members 4 and 5 thereof can be minimized in the fro-and-rear direction of hydrostatic transaxle apparatus T1.

On the outer periphery surface of counter shaft 38, a plurality of notches are radially formed in parallel to the axis of counter shaft 38 so as to serve as a counter output gear 38a. Above an intermediate portion of counter shaft 38, the falling portion of partition wall 4a is vertically pierced by a hole 4c between left and right bearing-retaining portions 4d. A large differential input gear 40 is disposed beside HST 1 comprising hydraulic pump 1a and motor 1b.

Differential input gear 40 is passed through hole 4c so as to make its outer peripheral teeth engage with counter output gear 38a.

As shown in FIG. 2, differential input gear 40 is axially pierced by a center hole 40a, into which inner ends of axles 6 are slidably rotatably inserted so as to face each other, thereby supporting differential input gear 40 between axles 6.

Differential input gear 40 is penetrated by a pair of holes 40b, which are disposed symmetrically to each other through center hole 40a. A pair of differential bevel pinions 41 are supported in respective holes 40b rotatably around an axis that is perpendicular to axles 6. Axles 6 are fixedly provided thereon with respective bevel side gears 42. Each of bevel side gears 42 engages with both differential pinions 41, thereby constituting a differential gear unit D differentially connecting axles 6 to each other.

Center section 9, whose rear end is disposed adjacently to the front end of left axle 6 as mentioned above, is also disposed adjacently to the left end of left differential bevel side gear 42 on left axle 6, so that HST 1 is extremely closed to both left axle 6 therebehind and differential gear unit D on the right side thereof, thereby further contributing for horizontal minimization of hydrostatic transaxle apparatus T1.

Figure 8:
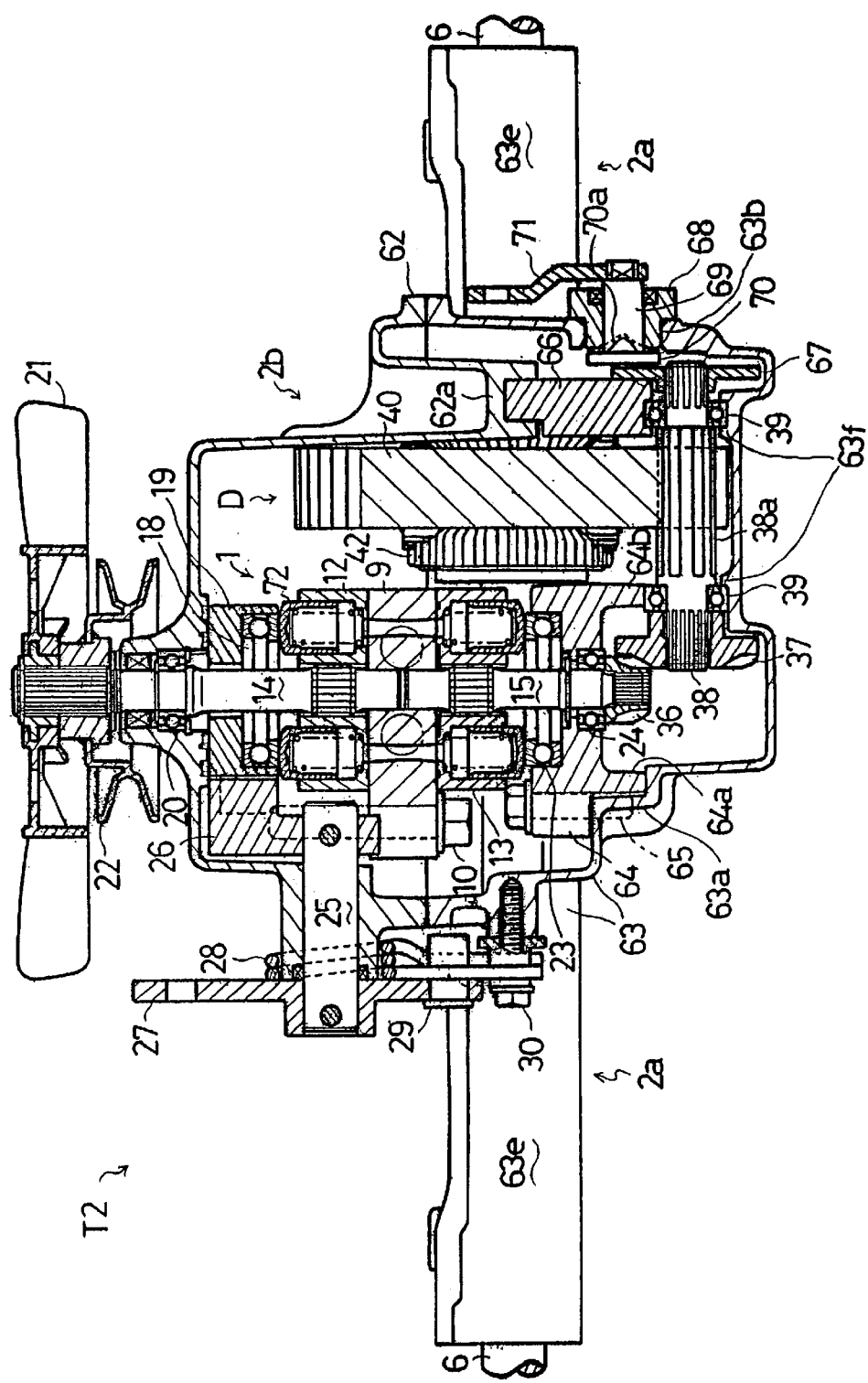
FIG. 8 is a sectional front view of a hydrostatic transaxle apparatus 60 according to a second embodiment of the present invention.

Description will now be given of a hydrostatic transaxle apparatus T2 as a second embodiment of the invention in accordance with FIGS. 8 to 10, only referring to members and portions which are different from those of hydrostatic transaxle apparatus T1 shown in FIGS. 1 to 7. The same reference numerals as those in FIGS. 1 to 7 designates members and portions which are identical or similar to the above-mentioned ones.

Transaxle housing 2 of hydrostatic transaxle apparatus T2 consists of a pair of upper and lower housing members 62 and 63 joined to each other through horizontal joint surface J. Upper housing member 62 substantially equals to the above-mentioned top housing member 3. Lower housing member 63 substantially equals to middle and bottom housing members 4 and 5 integrated with each other. Particularly, upper and lower housing members 62 and 63 journals axles 6 through bearings 8 and 8a in the same way with that of top and middle housing members 3 and 4 for journaling axles 6. That is, while both axles 6 are disposed below horizontal surface J in transaxle apparatus T2, retaining portions 62c and 63d for holding bearings 8 are integrally formed of upper and lower housing members 62 and 63, respectively, and left and right axle housing portions 63e for holding bearings 8a is integrally formed of lower housing member 63 so as to serve as left and right axle housing parts 2a of transaxle housing 2, similarly with retaining portions 3e and 4e for holding bearings 8 and axle housing portions 4f for holding bearings 8a.

A retainer 64 for fixedly retaining motor swash plate 23 is disposed in transaxle housing 61 and removably fixed to lower housing member 63 through a downwardly screwed bolt 65. As shown in FIG. 8, left and right bottom portions of retainer 64 is extended downward so as to serve as a fixture portion 64a and a bearing-retaining portion 64b. Fixture portion 64a fits a step portion 63a formed on the corresponding side of lower housing member 63.

Bearing-retaining portion 64b of retainer 64 retains the upper half of left bearing 39 for journalling the left portion of counter shaft 38. Along the right end of differential input gear 40, upper housing member 62 falls so as to form a falling portion 62a at the substantially vertically middle height of differential input gear 40. A vertically extended bearing-retainer 66 is fitted to the bottom of falling portion 62a so as to retain the upper half of right bearing 39 for journalling the right portion of counter shaft 38. Correspondingly to bearing-retainer 66 and bearing-retaining portion 64b of retainer 64, lower housing member 63 is integrally formed upwardly from the bottom thereof with bearing-retaining portions 63f for retaining the lower halves of right and left bearings 39, respectively. Due to this arrangement, such a vertically intermediate housing member as middle housing member 4 of hydrostatic transaxle apparatus T1 is not required.

A brake rotor 67 is provided on counter shaft 38. Specifically, brake rotor 67 is axially slidably but not-relatively rotatably fitted through splines around the right end of counter shaft 38 projecting rightward from right bearing 39.

The right side of lower housing member 63 facing the upper right end surface of brake rotor 67 is bored by an opening 63b, into which a boss member 68 is fixedly engaged. A brake rod 69 rotatably penetrates boss member 68 horizontally. In transaxle housing 61, a brake pad 70 is fixedly provided or integrally formed on the inner end of brake rod 69. Outside transaxle housing 61, a brake lever 71 is connected to the outer end of brake rod 69. Cams 70a projects laterally outward from brake pad 70. When brake arm 71 is set in neutral, cams 70a are inserted in recesses formed in boss member 68. If brake arm 71 is rotated from the neutral position, cams 70a are drawn out from the recesses so as to move brake rod 69 and brake pad 70 inward, whereby brake pad 70 is pressed against brake rotor 67.

For braking, brake lever 71 is rotated so as to push brake rod 69 inward (leftward), brake pad 70 is pressed against the upper right end surface of brake rotor 67, and further, against the right end surface of retainer 66 through brake rotor 67. That is, brake rotor 67 is sandwiched between brake pad 70 and retainer 66, thereby being stopped together with counter shaft 38 so as to brake axles 6.

Figure 9:
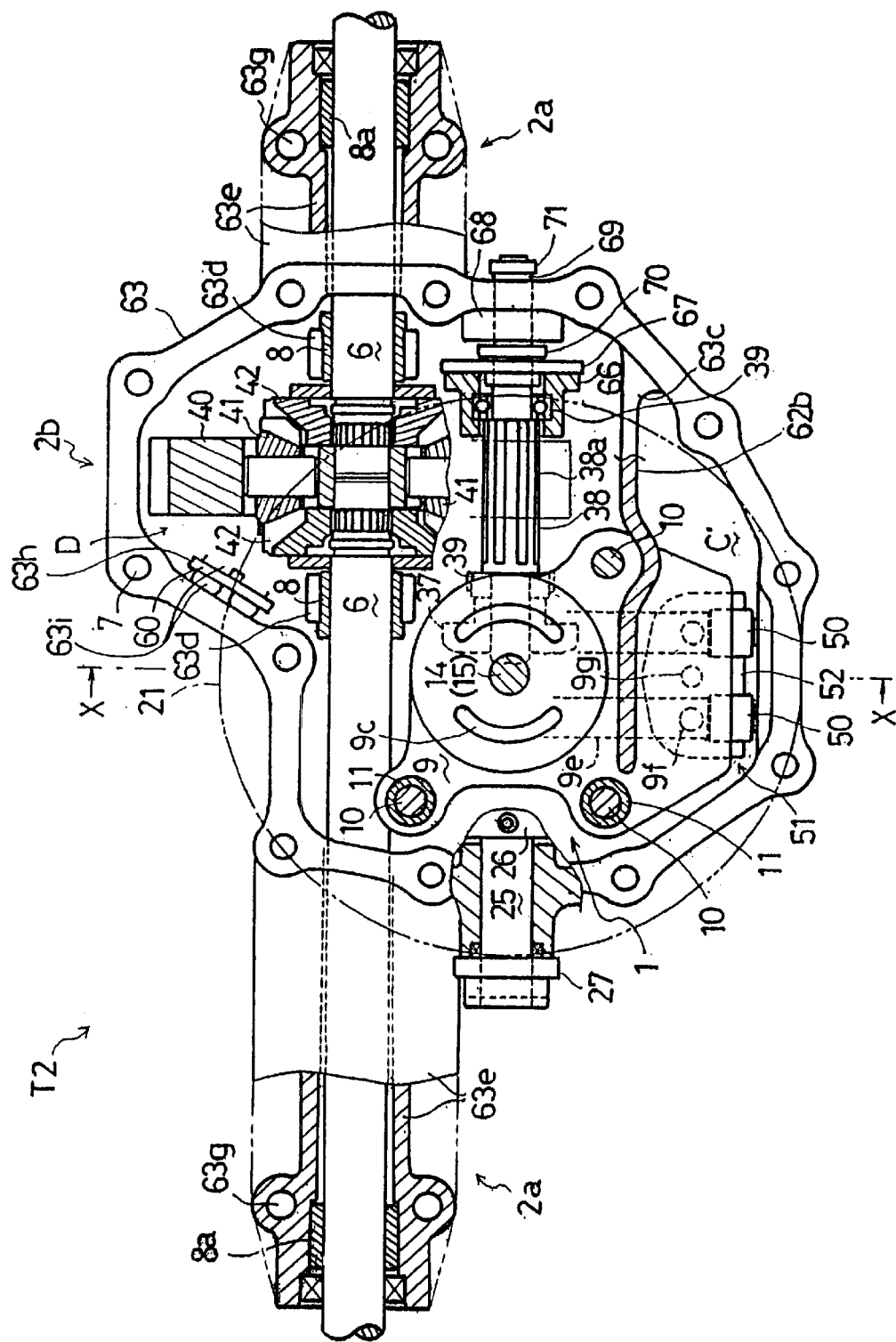
FIG. 9 is a plan view partly in section of the same from which an upper housing member 62 is removed.
Figure 10:
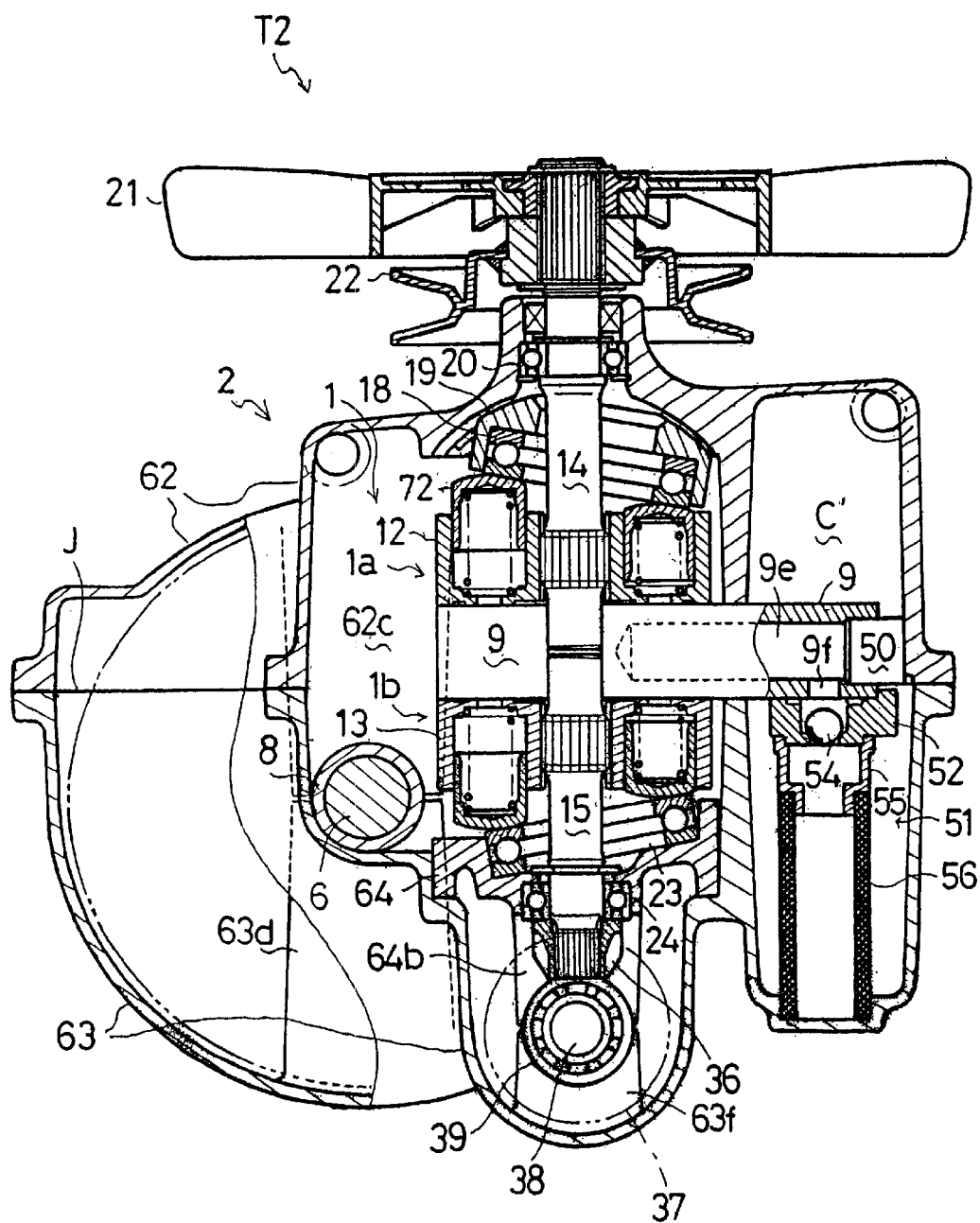
FIG. 10 is a cross sectional view taken on line X—X of FIG. 9.

For improving the filtering effect of oil filter 56, as shown in FIGS. 9 and 10, vertical upper and lower partition walls 62b and 63c are formed of upper and lower housing members 62 and 63, respectively, so as to be vertically opposed to each other. Partition walls 62b and 63c are disposed in front of counter shaft 38, differential gear unit D and HST 1 in front of partition walls 62b and 63c serves as a front chamber C', into which the front portion of center section 9 is horizontally forward extended so as to arrange oil charge assembly 51 therein.

Upper and lower partition walls 62b and 63c perfectly separate front chamber C' from the space behind partition walls 62b and 63c, except that the left ends thereof are separated from the left sides of housing members 62 and 63 with a gap, through which oil merely flows into front chamber C' from the rear space behind partition walls 62b and 63c. The gap is arranged extremely apart in the lateral direction of hydrostatic transaxle apparatus T2 from the gears meshing with one another among motor shaft 15, counter shaft 38 and axles 6. Consequently, there can be reduced the fear such that iron powder or other impurities generated from the gears are absorbed into oil filter 56. Thus, the endurance of HST 1 can be improved.

Moreover, as shown in FIG. 9, a magnet 60 having a discoid or another shape is arranged in the vicinity of differential gear unit D which is subject to a lot pf impurities such as iron powder generated by meshing of gears in differential gear unit D. In this regard, lower housing member 63 is formed at the bottom thereof with a downward slot-like recess 63h, into which the bottom end of magnet 60 is inserted. Also, lower housing member 63 is formed with holder portions 63i on both sides of recess 63h. Holder portions 63i abut against both side surfaces of magnet 60, thereby supporting magnet 60 uprightly. Magnet 60 absorbs metal impurities so as to clean oil within housing 2.

Incidentally, for another differential point of hydrostatic transaxle apparatus T2 from hydrostatic transaxle apparatus Ti, each of hydraulic pump 1a and motor 1b is provided with plunger-type pistons 72 replacing ball-type pistons 16. However, ball-type pistons 16 may be used.

Figure 11:
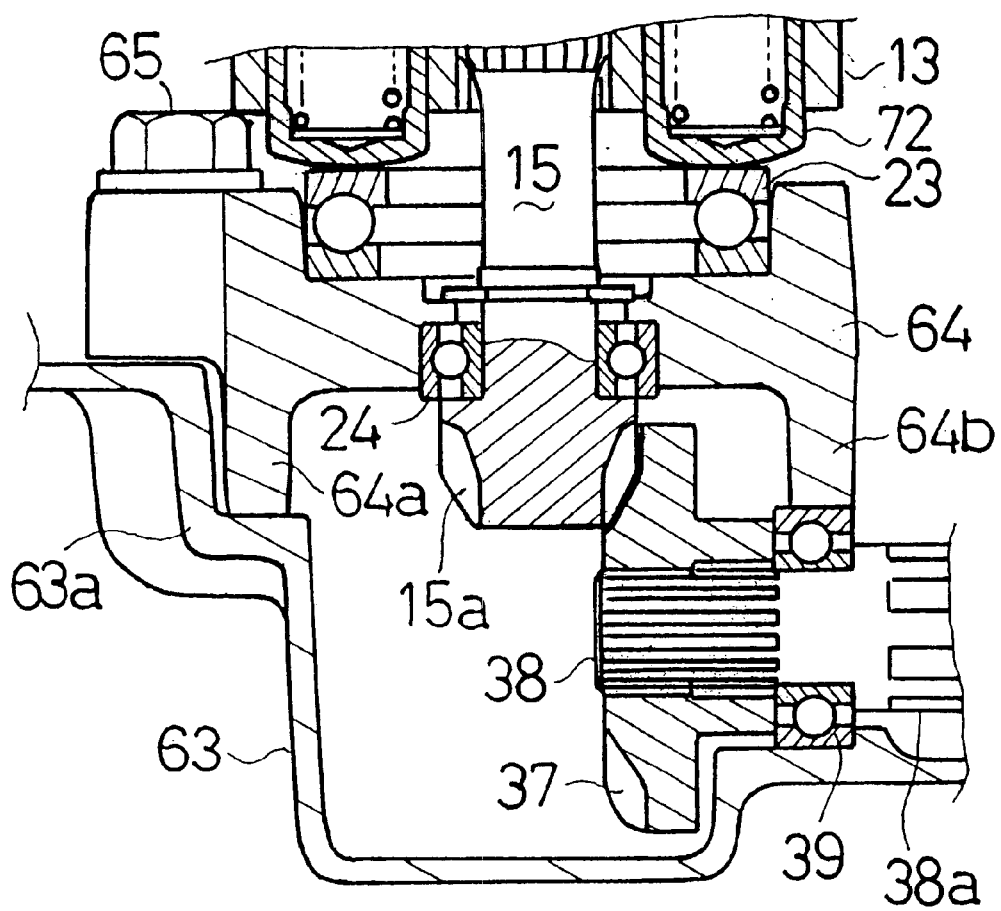
FIG. 11 is an enlarged fragmentary view of modified hydraulic transaxle apparatus T2, wherein a motor shaft 15 is integrally formed with a bevel gear serving as a motor output gear.

Referring to FIG. 11, the bottom end of motor shaft 15 may be formed with teeth serving as a bevel-like motor output gear 15a so as to engage with counter input gear 37 on counter shaft 38, thereby reducing the number of parts. Motor shaft 15 of hydrostatic transaxle apparatus T1 may be also formed at the bottom end thereof with such a motor output gear 15a. In this case, brake rotor 31 may be provided on motor output gear 15a.

Figure 12:
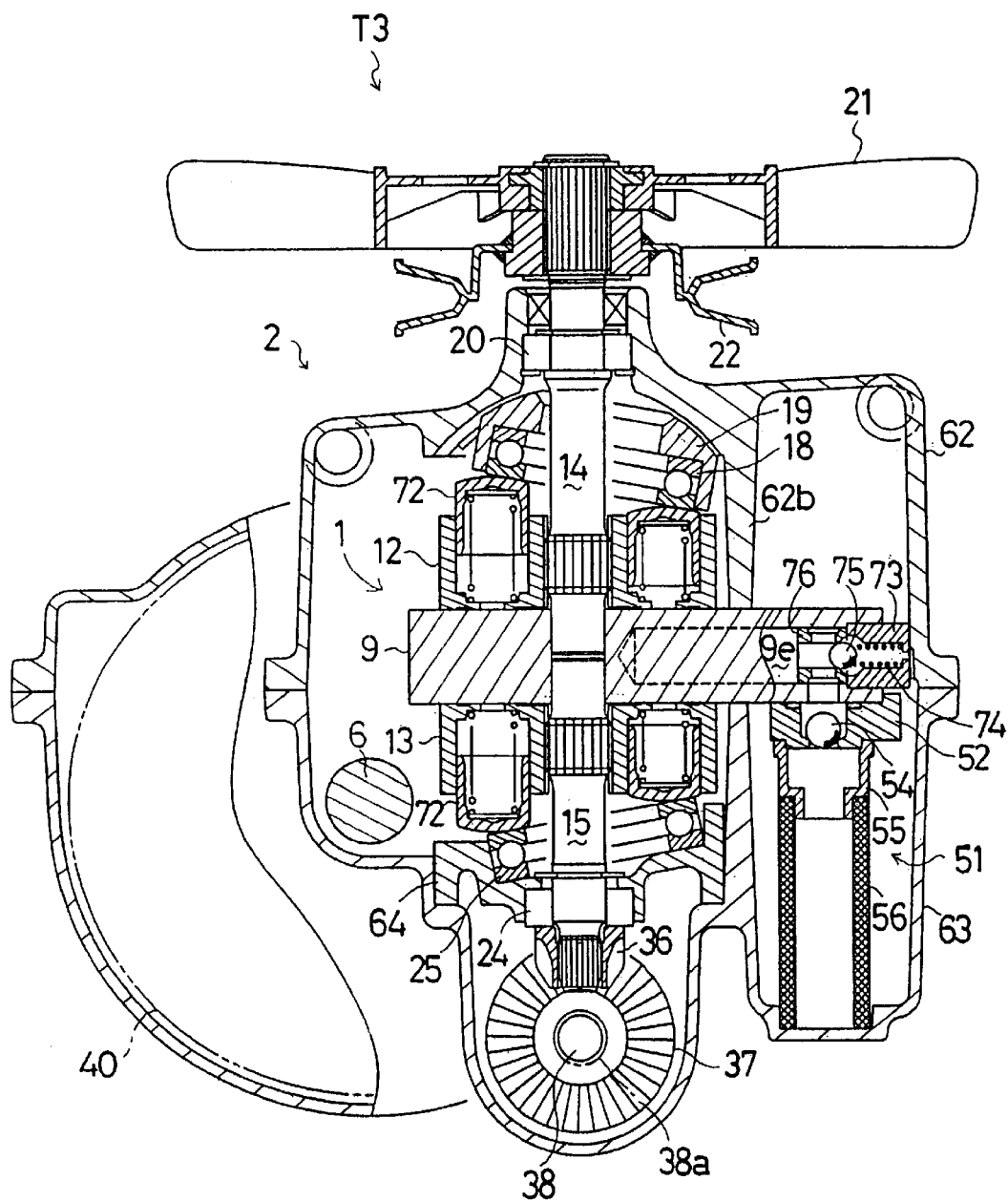
FIG. 12 is a sectional side view of a hydrostatic transaxle apparatus T3 according to a third embodiment of the present invention.
Figure 13:
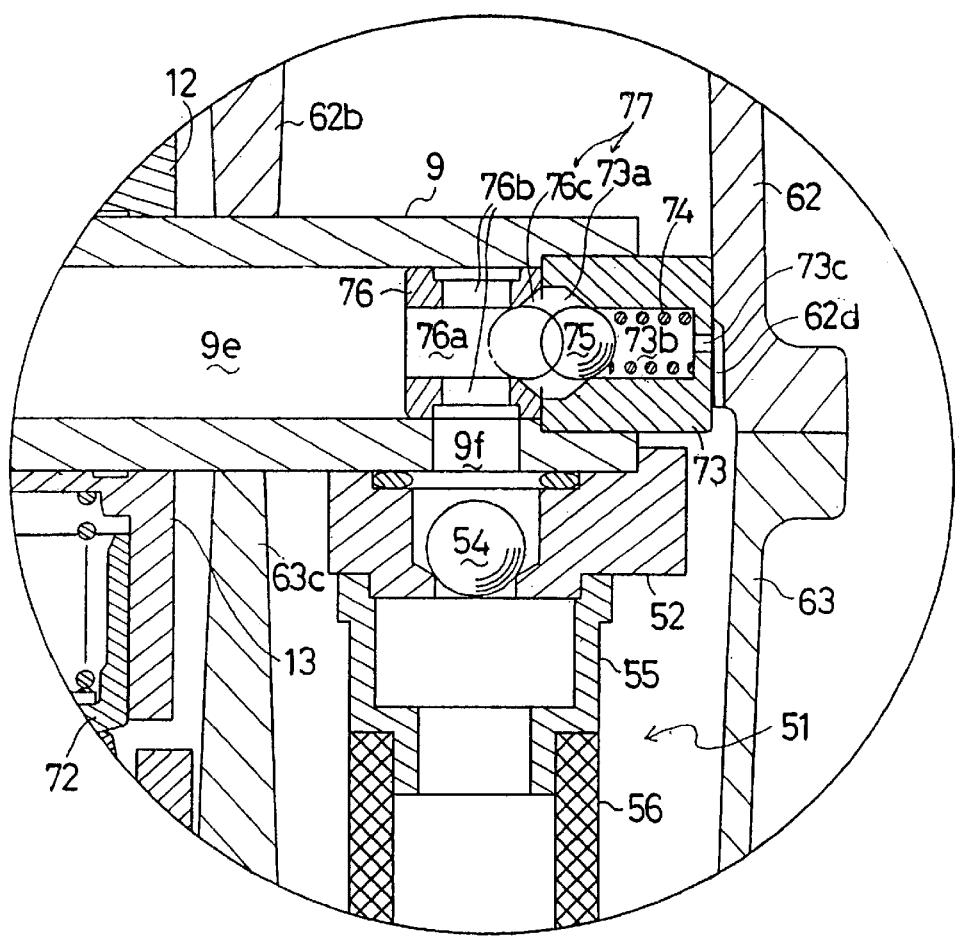
FIG. 13 is an enlarged fragmentary sectional side view of HST center section 9 of hydrostatic transaxle apparatus T3 showing a check valve for supplying hydraulic oil to HST 1 and a relief valve for shock absorbing.
Figure 14:
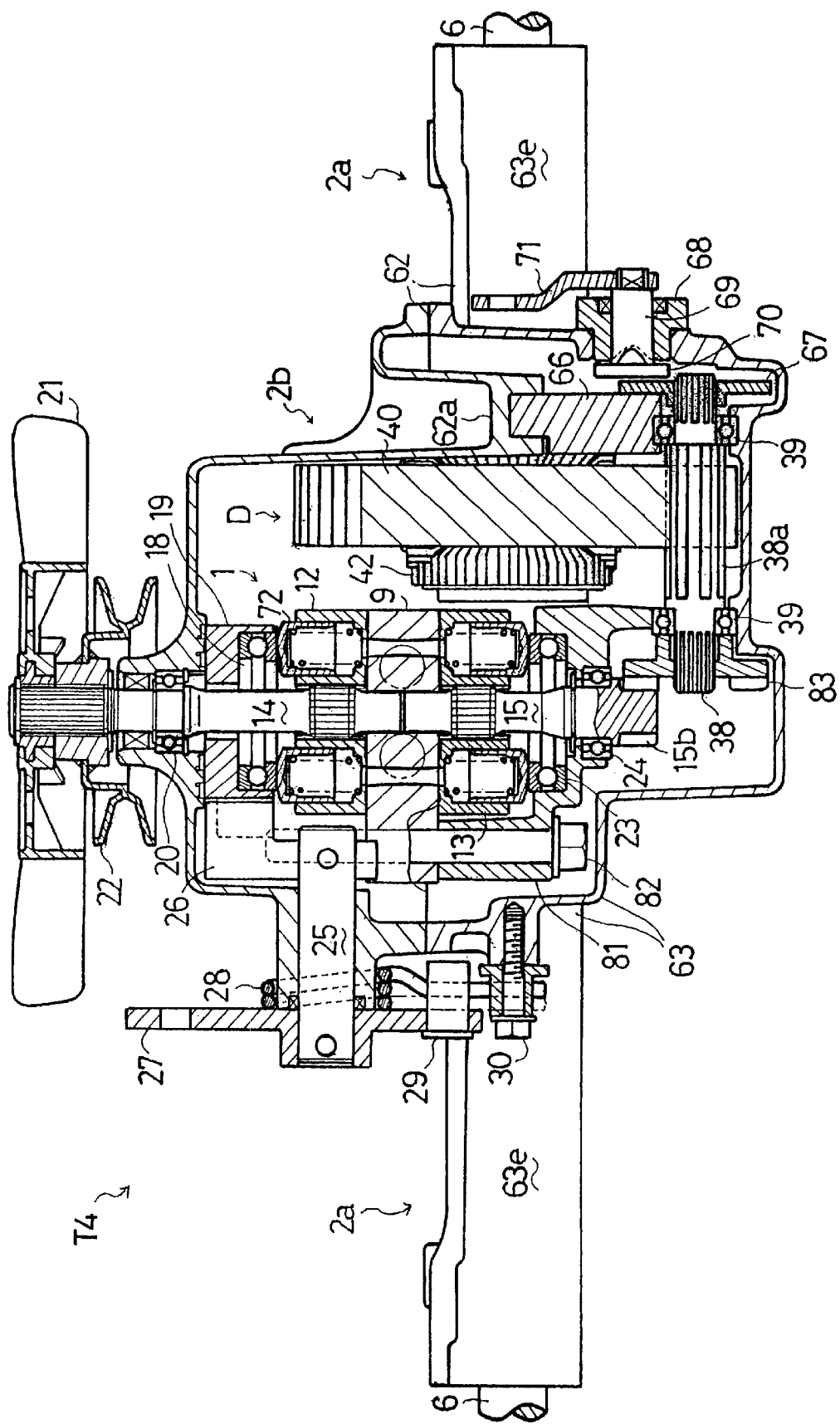
FIG. 14 is a sectional front view of a hydrostatic transaxle apparatus T4 according to a fourth embodiment of the present invention.

Description will be given of a transaxle apparatus T3 shown in FIGS. 12 and 13 as a third embodiment of the present invention. This is the same with hydrostatic transaxle apparatus T2 except that relief valves for shock absorbing in stopping and starting of a vehicle are attached to oil charge assembly 50 and the arrangement of center section 9 and the shapes of housing members 62 and 63 are changed in connection with the relief valves.

In hydrostatic transaxle apparatus T2, the height of center section 9 in relative to housing 2 is established so as to make horizontal joint surface J between upper and lower housing members 62 and 63 divide the outer end openings of oil passages 9e vertically. However, in hydrostatic transaxle apparatus T3, center section 9 is so arranged as to make the heights of the bottom ends of the outer end openings of oil passages 9e substantially coincide with the height of horizontal joint surface J. Also, the inside surface of upper hosing member 62 facing to the outer end openings of oil passages 9e is expanded more inward than the inside surface of lower housing member 63 just under there. The difference between the inside surfaces of upper and lower housing members 62 and 63 causes a channel 62d formed in upper housing member 62, which is downwardly open to the oil sump in housing 2, as shown in FIG. 13.

Instead of plugs 50 provided in center section 9 of hydrostatic transaxle apparatus T2, relief valve casings 73 plug respective oil passages 9e. The outer end surfaces of relief valve casings 73 abut against the inside surface of upper housing member 62 so as to prevent relief valve casings 73 from escaping. As shown in FIG. 13, each relief valve casing 73 from its inward end surface to its outer end surface are horizontally penetrated by a valve chamber recess 73a, a spring chamber 73b and an orifice 73c in series. Orifice 73c is open to channel 62d. A spring 74 is disposed in horizontally cylindrical spring chamber 73b so as to bias a valve ball 75 disposed in valve chamber recess 73a toward the inner end of oil passage 9e. The peripheral edge of opening of spring recess 73b to valve chamber recess 73a is made as a valve seat for restricting the movement of valve ball 75 toward the outer end of oil passage 9e.

A port member 76 is disposed in oil passage 9e continuously to the proximal side of relief valve casing 73. In port member 76 are bored crossing horizontal port 76a and vertical port 76b in communication with each other so as to make horizontal port 76a open to oil passage 9e constantly, and make vertical port 76b open to suction port 9f constantly. The outer end opening of horizontal port 76a is conically widened so as to serve as a valve chamber recess 76c. Valve chamber recess 76c is joined to valve chamber recess 73a in relief valve casing 73 so as to form a single valve chamber 77 in which valve ball 75 is disposed. The peripheral edge of opening of horizontal port 76a to valve chamber recess 76c is made as a valve seat for restricting the movement of valve ball 75 toward the inner end of oil passage 9e.

Oil charge assembly 51 comprising valve casing holding valve balls 54, joint member 55, oil filter 56 and so on is disposed downward from the pair of suction ports 9f of center section 9 in the same way of arrangement thereof in transaxle apparatuses T1 and T2.

In higher-pressured oil passage 9e, valve ball 75 arranged between the insides of port member 76 and relief valve casing 73 is made to abut against the valve seat between port 76a and valve chamber recess 76c until the hydraulic pressure in oil passage 9e overcomes the biasing force of spring 74. Therefore, oil in the oil sump of housing 2 before passing oil filter 56 is prevented from flowing into this oil passage 9e. On the contrary, oil absorbed into port member 76 from suction port 9f is properly drawn into lower-pressured oil passage 9e without escaping to the oil sump in housing 2 through orifice 73c.

There is a fear that hydraulic pump 1a may discharge a little hydraulic oil because of processing or assembling error even if the movable swash plate of hydraulic pump 1a is set in its neutral position. In this case, if the hydraulic pressure in higher-pressured oil passage 9e exceeds the biasing force of spring 74 to some degree, the hydraulic pressure pushes valve ball 75 toward the outer end of oil passage 9e against spring 74 so as to bring port 78a into communication with spring chamber 73b through valve chamber 77, thereby draining hydraulic oil from higher-pressure oil passage 9e into the oil sump in housing 2 through orifice 73c and channel 62d. Therefore, it is prevented that hydraulic motor 1b rotates even when hydraulic pump 1a is set in neutral, thereby ensuring the neutral position of HST 1. By further tilting the movable swash plate of hydraulic pump 1a, the pressure of hydraulic oil discharged from hydraulic pump 1a comes to excess the biasing force of spring 74 enough to make valve ball 75 contact with the valve seat between valve chamber recess 73a and spring chamber 73b, thereby preventing hydraulic oil from being excessively drained from higher-pressured oil passage 9e through orifice 73c so as to restrict the reduction of running efficiency of HST 1.

Description will be given of a hydrostatic transaxle apparatus T4 according to a fourth embodiment of the present invention. A retainer 81 replacing retainer 66 of hydrostatic transaxle apparatus T2 retains motor swash plate 23. The left end of retainer 81 project upward so as to be fixed to upper housing member 62 together with center section 9 through upwardly screwed bolts 82 replacing bolts 10. Below bolts 82 leftward from motor swash plate 23, instead of step portion 63a, the left bottom surface of lower housing member 63 can be plain and raised higher than the corresponding portion of lower housing member 63 of the second embodiment, thereby laterally narrowing the bottom portion of lower housing member 63 for enclosing the lower end of motor shaft 15 and counter shaft 38.

The right end of retainer 81 is extended downward for retaining the upper half of left bearing 39 around counter shaft 38.

Incidentally, the lower end of motor shaft 15 is formed into a face gear serving as a motor output gear 15b. Also, a face gear serving as a counter input gear 83 is fixed on the left end of counter shaft 83 so as to engage with motor output gear 15b.

Other members, parts and configurations are identical with those of hydrostatic transaxle apparatus T2.

Description will be given of a hydrostatic transaxle apparatus T5 shown in FIGS. 15 to 22, serving as a fifth embodiment of the present invention.

Hydrostatic transaxle apparatus T5 is approximately equal to hydrostatic transaxle apparatus T4 except that an oil charge assembly 50' can be also used as means for draining oil from center section 9 when a vehicle is drafted, and that a horizontally rotatable brake arm 90 is provided on the upper portion of housing 2.

Oil charge assembly 50' will be described in accordance with FIGS. 16 to 21. A valve casing 92 plugs the outer end opening of each oil passage 9e. Valve casing 92 is rotatably inserted into oil passage 9e and further penetrates housing members 62 and 63 so as to make the outer end surface project outward from housing 2. A slot 92a, into which a tip of a screwdriver or another tool can be inserted, is formed in the outer end surface of valve casing.

Valve casing 92 is vertically formed therein with a diametrically large chamber 92b and a diametrically small chamber 92c, which are continuous to each other through a step and open at the outer peripheral surface of valve casing 92. Valve ball 93 is disposed in large chamber 92b. The step between large and small chambers 92b and 92c serves as a valve seat for valve ball 93. In valve casing 92, a connection hole 92d for connection of large chamber 92b and oil passage 9e is bored, and an orifice 92e for connection of small chamber 92c and oil passage 9e is bored in parallel to connection hole 92d. One or both of valve casings 92 always drains hydraulic oil slightly through respective orifices 92a so as to prevent hydraulic pressure from rising when HST 1 is set in neutral.

Figure 16:
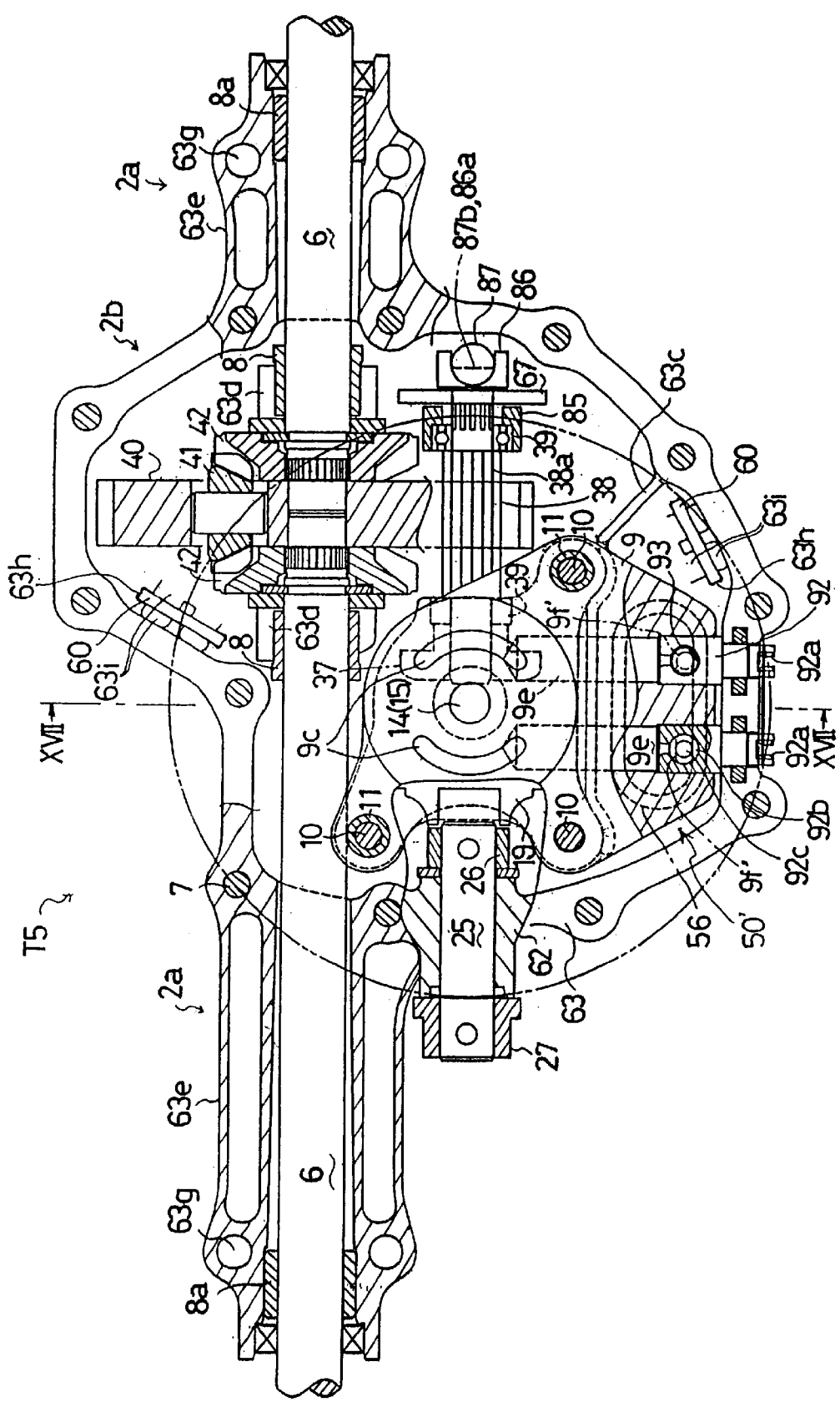
FIG. 16 is a plan view partly in section of the same from which upper housing member 62 is removed except for a part.
Figure 20:
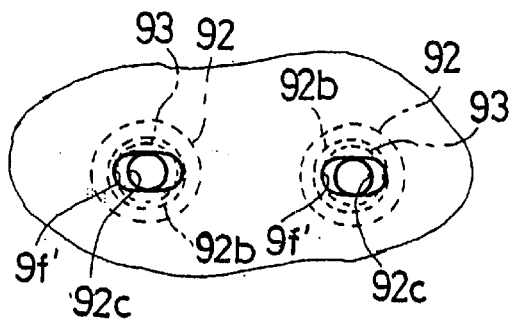
FIG. 20 is a fragmentary bottom view of center section 9 including the check valve set in the charge mode.
Figure 23:
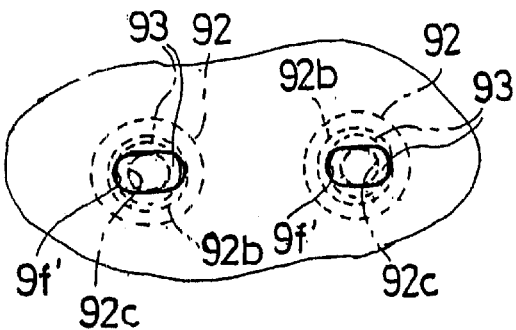
FIG. 23 is a fragmentary bottom view of center section 9 including the check valve set in the drain mode.

Similarly to transaxle apparatus T4, oil filter 56 is interposed between the bottom surface of center section 9 and the bottom surface of lower housing member 63 in front chamber C' separated from HST 1 by upper and lower partition walls 62b and 63c. Center section 9 is bored by a pair of ports 9f, which are ellipses having laterally longer widths when viewed in plan (bottom) as shown in FIGS. 16, 20 and 23. The lower ends of ports 9f are open at the bottom surface of center section 9 to the interior of oil filter 56, and each upper end thereof is allowed to join to either large chamber 92b or small chamber 92c in valve casing 92. Incidentally, when viewed in plan, the shorter width of ellipse of each port 9f in fore-and-aft direction is substantially equal to the sectional diameter of small chamber 92c.

Figure 18:
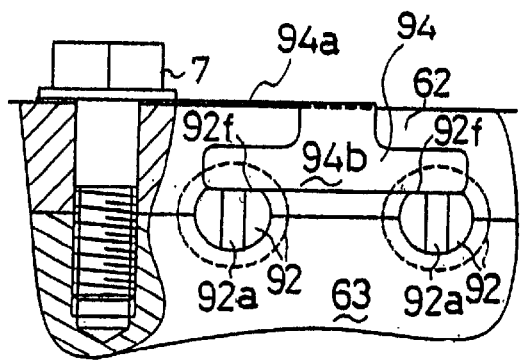
FIG. 18 is an enlarged fragmentary front view partly in section of hydrostatic transaxle apparatus T5, showing a check valve for supplying HST 1 with hydraulic oil, which is set in a charge mode.

The outer end surface of valve casing 92 disposed out of housing 2 is partly cut away so as to form a detent surface 92f. As shown in FIGS. 18 and 20, one bolt 7 fastening both housing members 62 and 63 is utilized so as to fit a holder 94 on upper housing member 62. Holder 94 is bent squarely so as to form a horizontal portion 94a and a vertical portion 94b. Horizontal portion 94a is fit along the upper surface of a flange portion of upper housing member 62, which is joined to a flange portion of lower housing member 63. Vertical portion 94b is fit along the foremost side surface of upper housing member 62. A head of bolt 7 presses down one end of horizontal portion 94a against upper housing member 62. The bottom end of vertical portion 94b abuts against the outer periphery of the outer end portions of valve casings 92. Holder 94 is made of metal material or so on, wherein at least horizontal portion 94a is elastically bendable.

Figure 19:
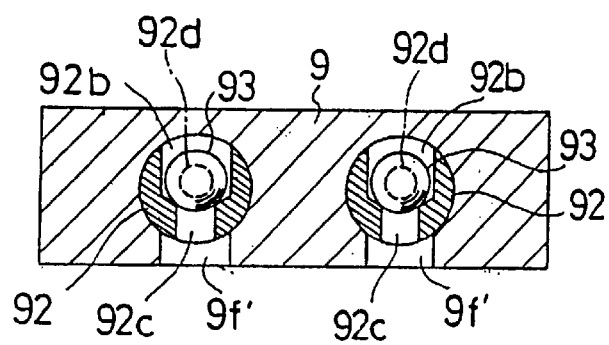
FIG. 19 is a sectional front view of HST center section 9 of the same, showing the check valve set in the charge mode.

While hydrostatic transaxle apparatus T5 is used normally, detent surface 92f is arranged horizontally and upward in each valve casing 92 and pressed against the bottom end of vertical portion 94b of holder 94, as shown in FIG. 18, whereby valve casings 92 are firmly located at fixed positions. In this state, as shown in FIG. 19, large camber 92b is disposed above small chamber 92c in valve casing 92 so that the lower end of small chamber 92c is joined to the upper end of port 9f. That is, each valve casing 92 is put in a charge mode, where the valve seat serving as the step between large and small chambers 92b and 92c is disposed under valve ball 93. In this mode, valve ball 93 in higher-pressured oil passage 9e receives hydraulic pressure so as to be put on the valve seat, thereby separating small chamber 92c from connection hole 92. Valve ball 93 in lower-pressured oil passage 9e is raised by hydraulic pressure when the hydraulic pressure in this oil passage 9e is depressed, so that small chamber 92c is connected to connection hole 92e through large chamber 92b, thereby allowing oil in oil filter 56 to flow into oil passage 92e.

Figure 21:
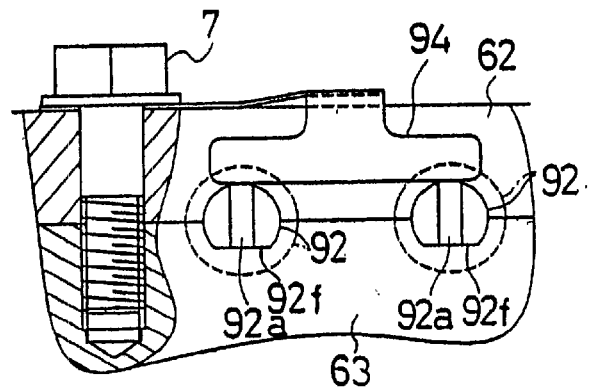
FIG. 21 is an enlarged fragmentary front view partly in section of hydrostatic transaxle apparatus T5, showing the check valve for supplying HST 1 with hydraulic oil, which is set in a drain mode.

If oil in center section 9 must be drained into the oil sump in housing 2 for draft of the vehicle equipped with transaxle apparatus T5 or for another purpose, a tool which is fitted into slot 92a is half-turned together with valve casing 92, thereby making detent surface 92f downward, as shown in FIG. 21. Holder 94 allows valve casing 92 to rotate because horizontal portion 94a is elastically curved. Furthermore, horizontal portion 94a is so flexible as to allow any of two valve casings 92 to be turned in advance of the other.

Thus, each valve casing 92 is put into a drain mode where large chamber 92b is disposed under small chamber 92c so as to join the lower end opening of large chamber 92b to the upper end opening of port 9f. At this time, the valve seat is disposed above valve ball 93 so that valve ball 92 is separated from the valve seat by its own weight so as to connect port 9f and oil passage 9e to each other constantly. Therefore, oil in oil passages 9e is drained through valve casings 92 and ports 9f into oil filter 56.

Figure 22:
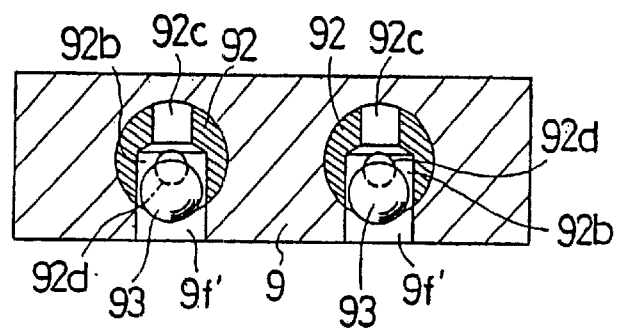
FIG. 22 is a sectional front view of HST center section 9 of the same, showing the check valve set in the drain mode.

A brake structure in hydrostatic transaxle apparatus T5 will now be described in accordance with FIGS. 15, 16 and 22. Brake rotor 67 of transaxle apparatus T5 is provided around the end of counter shaft 38 oppositely to bevel gear 37 and is pressed against a retainer 85, which retains bearing 39 in the vicinity of brake rotor 67, so as to brake counter shaft 38, similarly to brake rotor 67 of any of transaxle apparatuses T2 to T4. Although brake arm 72 is rotated vertically, a brake arm 90 of transaxle apparatus T5 is rotated horizontally and disposed above upper housing member 62.

Correspondingly, a brake control shaft 87 is fixed to brake arm 90 and extended vertically downward from brake arm 90. The lower portion of brake control shaft 87 is cut away so as to form a cam surface 87b, which faces brake rotor 87. The lower portion of brake control shaft 87 is rotatably held in a square recess 86a of a brake pad 86, which is squarely U-like shaped when viewed in plan. Brake pad 86 is disposed between cam surface 87b of brake control shaft 87 and brake rotor 67. As shown in FIG. 15, a projection 85a is formed of retainer 85 so as to slidably abut against the top surface of brake pad 86. The bottom surface of brake pad 86 abuts against lower housing member 63. Thus, brake pad 86 is located vertically.

Figure 15:
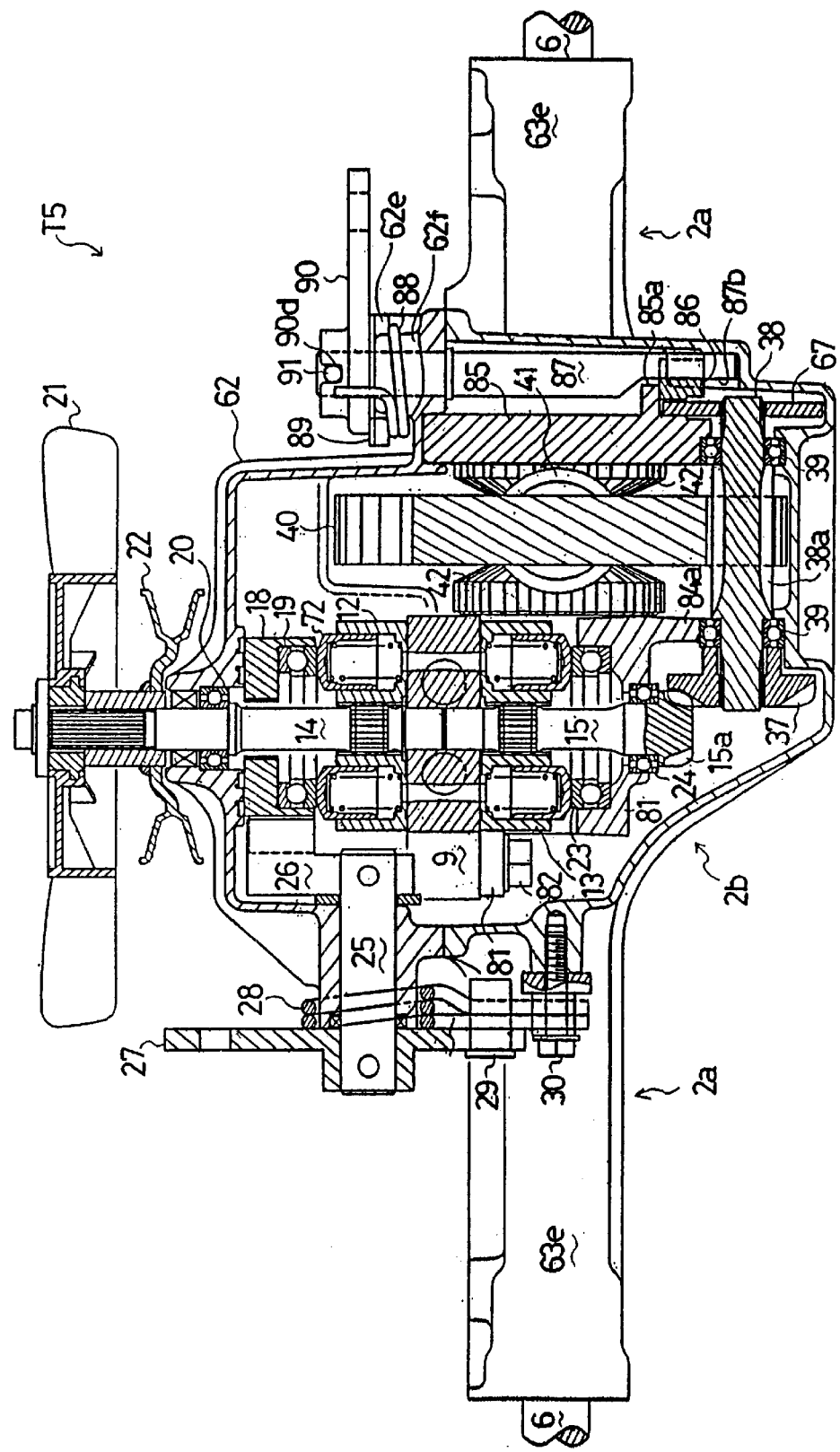
FIG. 15 is a sectional side view of a hydrostatic transaxle apparatus T5 according to a fifth embodiment of the present invention.

Brake arm 90 is extended either leftward or rightward (rightward in FIG. 15). When brake arm 90 is located in a neutral position, cam surface 87b is exactly oriented in the fore-and-aft direction (perpendicularly to axles 6 and counter shaft 38), when viewed in plan as shown in FIG. 16, so as to separate brake pad 86 from brake rotor 67. If brake arm 90 is rotated forward or rearward from the neutral position, cam surface 87b is inclined to some degree from the fore-and-aft direction so as to push brake pad 86 to brake rotor 67, whereby brake pad 86 and retainer 85 tightly sandwich brake rotor 67 so as to brake it together with counter shaft 38.

Brake arm, 90 is interlockingly connected through a linkage to a pedal or a lever, which is manipulated by a driver. If the braking were performed by rotating brake arm 90 only either forward or rearward from the neutral position, the linkage would be constrained in its arrangement and structure. However, whether brake arm 90 is rotated forward or rearward from the neutral position, brake control shaft 87 presses brake pad 86 against brake rotor 67 so as to brake counter shaft 38.

By biasing brake arm 90 toward its neutral position, a brake-operating device like a pedal or a lever manipulated by a driver automatically returns to the neutral position when the manipulative braking force applied on it is loosened.

In this embodiment, both ends 88a of a spring 88 for neutral-return of brake arm 90 are restrained by brake arm 90 (and a later-discussed washer 89) so that they can be assembled easily.

The assembly of brake arm 90, spring 88 and others will be described in accordance with FIG. 24. Upper housing member 62 is formed with an upwardly projecting boss portion 62f through which brake control shaft 87 is passed. A coiled spring 88a whose both ends 88a are bent upward is wounded around boss portion 62f.

Furthermore, upper housing member 62 is formed with a pair of upwardly projecting front and rear stay portions 62e immediately adjacent to boss portion 62f. An upper portion of brake control shaft 87 projects upward from boss portion 62f so as to be rotatably passed through a shaft hole 90a in a washer 89 and a shaft hole 90a in a base end portion of brake arm 90 above washer 89. The upper lobe of brake control shaft 87 above shaft hole 90a is bored by a pin hole 87a. As shown in FIG. 15, a retaining pin 91 is passed through pin hole 87a and inserted into a detent notch 90c of brake arm 90 (detent notch 90c is omitted in FIG. 24 for convenience to fine view of later-discussed detent notches 90b), thereby fixing brake control shaft 87 to brake arm 90.

Figure 24:
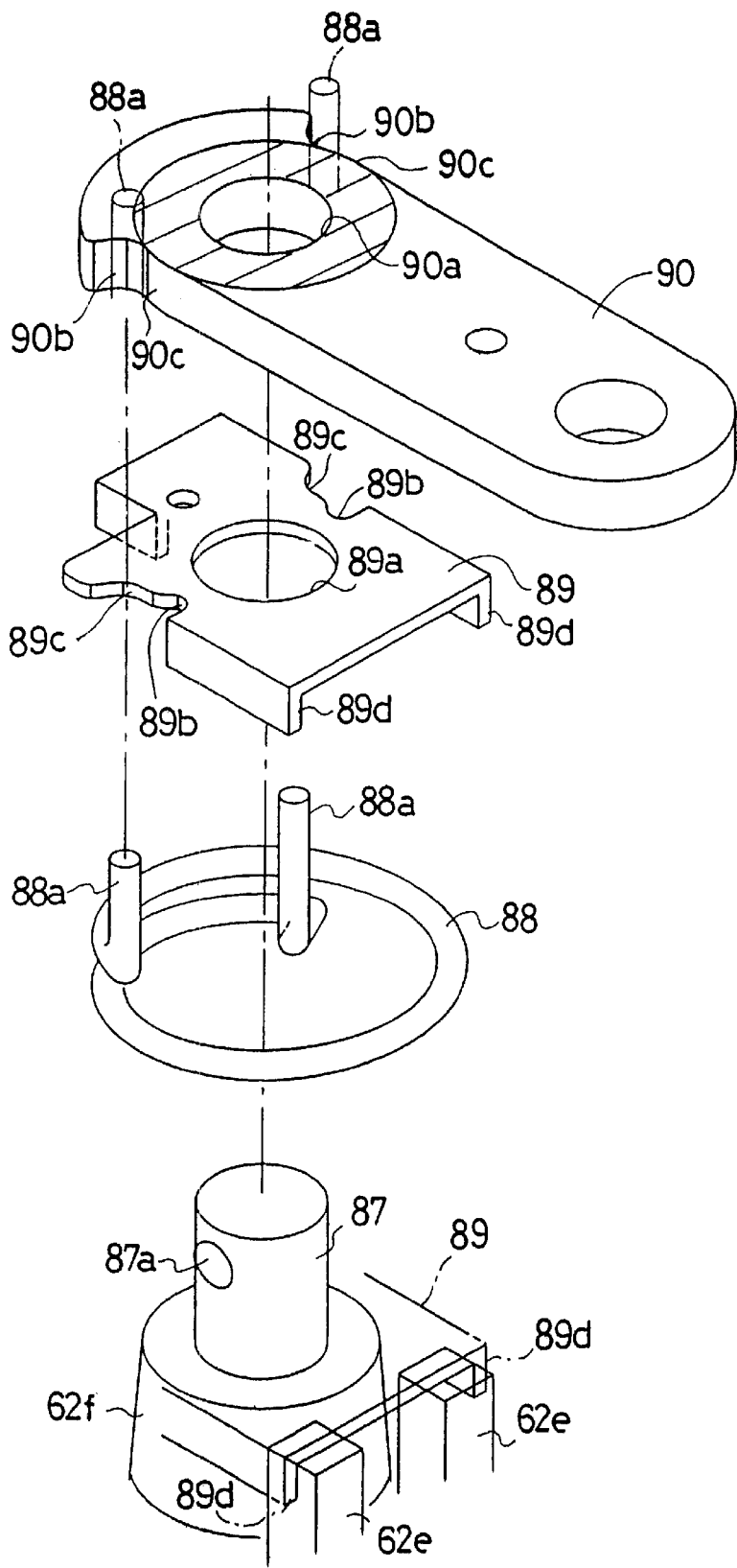
FIG. 24 is an exploded perspective view of a mechanism for neutral return of a brake arm, which is adopted in hydrostatic transaxle apparatus T5.

As shown in FIG. 24, front and rear edges 89d of washer 89 beside shaft hole 89a are bent downward so as to be fit on a front surface of front stay portion 62e and a rear surface of rear stay portion 62e, respectively, thereby fixing washer 89 to housing 2. Each of front and rear edges of washer 89 in front and rear of shaft hole 89a is formed into a detent edge 89b and a slide guide edge 89c in series. Each of front and rear edges of brake arm 90 in front and rear of shaft hole 90a is formed into a detent edge 90b just above corresponding detent edge 89b and slide guide edge 89c. Each detent edge 90b of brake arm 90 restricts the movement of each spring end 88a in its biasing direction. On the contrary, each detent edge 89b of washer 89 restricts the movement of each spring end 88a against its biasing force.

When brake arm 90 is set in neutral, both ends 88a of spring 88 are engaged in respective detent edges 90b of brake arm 90 and abut against respective slide guide edges 89c of washer 89.

On behalf of forward and rearward rotation of brake arm 90 from its neutral position by manipulating a brake operating device such as a pedal or a lever, description will be given of the case of forward rotation of brake arm 90 (i.e., the case where the right end of brake arm 90 is rotated forward in FIG. 15). During this forward rotation, front spring end 88a remains, and rear spring end 88a fitting detent edge 90b moves together with brake arm 90.

Then, if the manipulating force applied on brake arm 90 is loosened, rear spring end 88a automatically pushes detent edge 90b so as to return brake arm 90 to the neutral position, thereby returning the manipulated pedal or lever automatically to the original position through the linkage. If brake arm 90 is rotated rearward from the neutral position, front spring end 88a moves while rear spring end 88a remains. Brake arm 90 automatically returns to the neutral position by neutral-return of front spring end 88a when rotated bake arm 90 is loosened. In this way, whether the arrangement and structure of linkage connected to brake arm 90 make brake arm 90 rotate forward or rearward for braking, the neutral-biasing force can be given to brake arm 90 when brake arm 90 is in its braking position.

Figure 17:
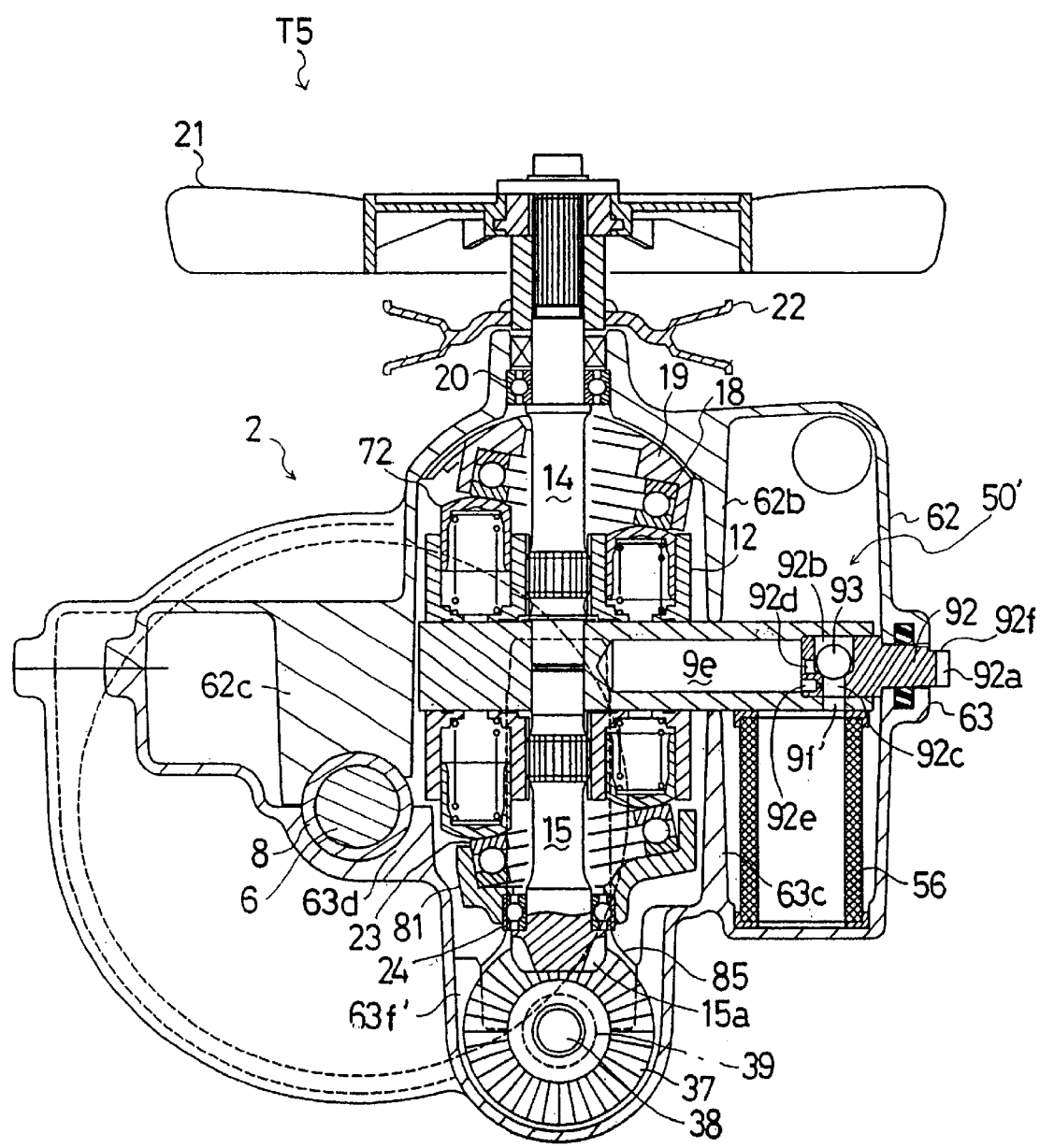
FIG. 17 is a cross-sectional view taken along XVII—XVII line of FIG. 16.

Some other distinctive structures in transaxle apparatus T5 will be described. As shown in FIG. 15, in order to simplify the process of upper housing member 62, a ceiling of upper housing member 62 above retainer 85 is flat without such a falling portion 62a of transaxle apparatuses T2 to T4. Retainer 85 is upwardly elongated so as to compensate for the expanded space under the ceiling of upper housing member 62. Furthermore, although bearing-retaining portion 63f of lower housing member 63 in transaxle apparatus T2 or the like, retains bearing 39 in collaboration with retainer 66, which is separate from bearing-retaining portion 63f, the lower edge of retainer 85 is engaged into a bearing-retaining portion 63f formed of lower housing member 63 in transaxle apparatus T5, as shown in FIG. 17.

Incidentally, for drivingly connecting motor shaft 15 to counter shaft 38, similarly to the embodiment shown in FIG. 11, bevel motor output gear 15a is formed of motor shaft 15 so as to mesh with bevel gear 37 fixed on one end of counter shaft 38.

Moreover, as shown in FIG. 16, in addition to magnet 60 adjacent to differential gear unit D, magnet 60 for absorption of metal impurities is supported by lower housing member 63 adjacently to oil filter 56 in front chamber C' in the same way.

It is further understood by those skilled in the art that the foregoing description is a preferred embodiment of the disclosed apparatus and that various changes and modifications may be made in the invention without departing from the spirit and scope thereof. For example, counter shaft 38 and differential gear unit D including differential input gear 40, which are arranged rightward of HST 1 in the five above-mentioned embodiments, may be arranged leftward of HST 1.

What is claimed is:

1. A hydrostatic transaxle apparatus, comprising:
    a housing filled therein with fluid so as to serve as a fluid sump;
    an axle disposed in said housing;
    a hydraulic pump disposed in said housing to be drivingly connected to a prime mover;
    a hydraulic motor disposed in said housing to be drivingly connected to said axle; and
    a center section disposed in said housing adjacently to said axle to fluidly connect said hydraulic pump and said hydraulic motor to each other, said center section including
        a pump mounting surface onto which said hydraulic pump is mounted,
        a motor mounting surface onto which said hydraulic motor is mounted, said motor mounting surface being parallel to said pump mounting surface, and
        a common axis penetrating said center section through both said pump mounting surface and said motor mounting surface, wherein both rotary axes of said hydraulic pump and said hydraulic motor coincide with said common axis, and wherein said common axis is disposed substantially perpendicularly to a longitudinal direction of said axle.

2. The hydrostatic transaxle apparatus as set forth in claim 1, wherein said center section is separably secured in said housing.

3. The hydrostatic transaxle apparatus as set forth in claim 1, further comprising:
    a pair of first and second housing members joined to each other through a joint surface along a longitudinal direction of said axle so as to constitute said housing, wherein said center section is separably secured with said first housing member so as to set said joint surface between said pump mounting surface and said motor mounting surface in parallel, wherein said hydraulic pump mounted onto said pump mounting surface is disposed in said first housing member, and wherein said hydraulic motor mounted onto said motor mounting surface is disposed in said second housing member.

4. The hydrostatic transaxle apparatus as set forth in claim 1, further comprising:

a cooling fan disposed outside said housing so as to make an axis of said cooling fan coincide with said common axis, wherein most of said housing except a portion thereof for housing said axle is disposed within an area of rotary locus of said cooling fan when viewed along said common axis.

5. The hydrostatic transaxle apparatus as set forth in claim 1, further comprising:

a pump shaft, whose rotary axis serves as said rotary axis of said hydraulic pump, having a first end surface and a second end surface in parallel to each other;

a motor shaft, whose rotary axis serves as said rotary axis of said hydraulic motor, having a first end surface and a second end surface in parallel to each other;

a common hole, whose axis serves as said common axis, penetrating said center section through both said pump mounting surface and said motor mounting surface, wherein said pump shaft and said motor shaft are inserted together into said common hole so that said first end surfaces of said pump shaft and motor shaft face each other in said common hole.

6. The hydrostatic transaxle apparatus as set forth in claim 5, wherein said pump shaft and motor shaft are extended oppositely to each other from said respective first end surfaces thereof in said common hole to said respective second end surfaces thereof, wherein said axle is disposed between a pair of parallel surfaces in which said second end surfaces of both said pump shaft and motor shaft are disposed respectively.

7. The hydrostatic transaxle apparatus as set forth in claim 6, wherein said axle is disposed between a pair of parallel surfaces in which said first and second end surfaces of said motor shaft are disposed respectively.

8. The hydrostatic transaxle apparatus as set forth in claim 5, wherein said common hole of said center section is shaped so as to prevent said first end surfaces of both said hydraulic pump and motor from contacting with each other.

9. The hydrostatic transaxle apparatus as set forth in claim 5, wherein said motor shaft is integrally formed with a bevel gear so as to be drivingly connect ed to said axle.

10. The transaxle apparatus as set forth in claim 5, further comprising:

a counter shaft disposed perpendicularly to said motor shaft so as to transmit torque of said motor shaft to said axle; and a face gear for drivingly connecting said counter shaft to said motor shaft.

11. The hydrostatic transaxle apparatus as set forth in claim 5, further comprising:

a movable pump swash plate disposed in said housing so as to change capacity and fluid-discharge direction of said hydraulic pump;

a control shaft supported by said housing so as to control said movable pump swash plate; and a counter shaft disposed in said housing so as to transmit torque of said motor shaft to said axle, wherein said control shaft and said counter shaft are disposed in parallel to each other on a common surface.

12. The hydrostatic transaxle apparatus as set forth in claim 11, wherein said common axis is disposed on said common surface.

13. The hydrostatic transaxle apparatus as set forth in claim 1, wherein said center section is formed with a charge suction port for supplying fluid from said housing to a fluid circuit within said center section, further comprising:

a partition wall disposed in said housing so as to separate said charge suction port from said hydraulic pump and hydraulic motor mounted on said center section.

14. The hydrostatic transaxle apparatus as set forth in claim 13, wherein said partition wall is integrally formed of said housing.

15. The hydrostatic transaxle apparatus as set forth in claim 1, further comprising:

a pair of said axles; and a differential unit disposed in said housing so as to differentially connect said pair of axles to each other, wherein said center section is disposed adjacently to said differential unit and one of said axles.

16. A hydrostatic transaxle apparatus, comprising:

a housing filled therein with fluid so as to serve as a fluid sump;

a horizontal axle disposed in said housing;

a hydraulic pump disposed in said housing so as to be drivingly connected to a prime mover;

a hydraulic motor disposed in said housing so as to be drivingly connected to differential gear unit;

a center section disposed in said housing so as to fluidly connect said hydraulic pump and hydraulic motor to each other, wherein said hydraulic pump is disposed above said hydraulic motor through said center section;

a vertical pump shaft of said hydraulic pump, a top end surface of said pump shaft being disposed in a first horizontal surface; and a vertical motor shaft of said hydraulic motor disposed coaxially with said pump shaft, a bottom end surface of said motor shaft being disposed in a second horizontal surface, wherein said axle is disposed between said first and second horizontal surfaces.

17. The hydrostatic transaxle apparatus as set forth in claim 16, wherein a top end surface of said motor shaft is disposed in a third horizontal surface, and wherein said axle is disposed between said second and third horizontal surfaces.

18. The hydrostatic transaxle apparatus as set forth in claim 16, said pump shaft projecting outward from said housing, further comprising:

a cooling fan provided on the outward projecting portion of said pump shaft, wherein most of said housing except a portion thereof for housing said axle is disposed within an area of rotary locus of said cooling fan when being viewed along said pump shaft.

19. The hydrostatic transaxle apparatus as set forth in claim 16, wherein said pump shaft and said motor shaft are disposed coaxially with each other so as to face each other within said center section, and wherein said center section is formed so as to prevent said motor shaft from being slipped upward from a proper position thereof.

20. The hydrostatic transaxle apparatus as set forth in claim 16, further comprising:

a movable pump swash plate disposed in said housing so as to change capacity and fluid-discharge direction of said hydraulic pump;

a control shaft supported by said housing so as to control said movable pump swash plate; and a counter shaft disposed in said housing so as to transmit torque of said motor shaft to said axle, wherein said control shaft and said counter shaft are disposed in parallel to each other on a common vertical surface.

21. The hydrostatic transaxle apparatus as set forth in claim 20, wherein said coaxial axes of said pump and motor shafts are disposed on said common vertical surface.

22. The hydrostatic transaxle apparatus as set forth in claim 16, wherein said center section is formed with a charge suction port for supplying fluid from said housing to a fluid circuit within said center section, further comprising:

a partition wall disposed in said housing so as to separate said charge suction port from said hydraulic pump and hydraulic motor mounted on said center section.

23. The hydrostatic transaxle apparatus as set forth in claim 22, wherein said partition wall is integrally formed of said housing.

24. The hydrostatic transaxle apparatus as set forth in claim 16, wherein said vertical motor shaft is integrally formed with a bevel gear so as to be drivingly connected to said horizontal axle.

25. The transaxle apparatus as set forth in claim 16, further comprising:

a counter shaft disposed in said housing so as to transmit torque of said motor shaft to said axle, said counter shaft being disposed perpendicularly to said motor shaft; and a face gear for drivingly connecting said counter shaft to said motor shaft.

* * * * *